(12) United States Patent
Zhang et al.

(10) Patent No.: US 8,705,839 B2
(45) Date of Patent: Apr. 22, 2014

(54) ELECTRONIC DEVICES FOR DEFECT DETECTION

(75) Inventors: Qiang Zhang, Tempe, AZ (US); Xinyu Xu, Camas, WA (US); Chang Yuan, Camas, WA (US); Hae-Jong Seo, Vancouver, WA (US); Petrus J. L. Van Beek, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 215 days.

(21) Appl. No.: 13/300,331

(22) Filed: Nov. 18, 2011

(65) Prior Publication Data

US 2013/0129188 A1    May 23, 2013

(51) Int. Cl.
*G06K 9/00* (2006.01)

(52) U.S. Cl.
USPC ......................................... 382/144

(58) Field of Classification Search
USPC ............ 382/141, 144, 149, 250, 276; 348/92, 348/125
See application file for complete search history.

(56) References Cited

U.S. PATENT DOCUMENTS

| | | | |
|---|---|---|---|
| 6,539,106 B1 * | 3/2003 | Gallarda et al. | 382/149 |
| 7,162,073 B1 * | 1/2007 | Akgul et al. | 382/149 |
| 2004/0202361 A1 | 10/2004 | Evans et al. | |
| 2008/0107328 A1 | 5/2008 | Chen et al. | |

FOREIGN PATENT DOCUMENTS

| | | |
|---|---|---|
| JP | 2005-061929 | 3/2005 |
| JP | 2006-195947 | 7/2006 |
| JP | 2006-234656 | 9/2006 |
| JP | 2008-011005 | 1/2008 |

OTHER PUBLICATIONS

Oppenheim, Alan V., et al., "The Importance of Phase in Signals," Proceedings of the IEEE, Vo. 69, No. 5, pp. 529-541, May 1981.
Aiger, Dror, et al., "The Phase Only Transform for Unsupervised Surface Defect Detection," IEEE Conference on Computer Vision and Pattern Recognition (CVPR), pp. 295-302, 2010.
Hou, X., et al., "Image Signature: Highlighting Sparse Salient Regions," IEEE Transactions on Pattern Analysis and Machine Intelligence, vol. 99, No. 1, 2011.
See, K.W., et al., "Image Reconstruction Using Various Discrete Orthogonal Polynomials in Comparison with DCT," Applied Mathematics and Computation, vol. 193, No. 2, pp. 346-359, 2007.

* cited by examiner

*Primary Examiner* — Daniel Mariam
(74) *Attorney, Agent, or Firm* — Austin Rapp & Hardman

(57) ABSTRACT

An electronic device configured for defect detection is described. The electronic device includes a processor and instructions stored in memory that is in electronic communication with the processor. The electronic device performs background suppression on the image data based on a transform of the image data to obtain a score map. The electronic device also applies thresholding to the score map to generate a detection mask. The thresholding comprises bi-thresholding. The electronic device additionally detects any defects based on the detection mask. The electronic device further indicates any defects.

34 Claims, 11 Drawing Sheets

ELECTRONIC DEVICES FOR DEFECT DETECTION

TECHNICAL FIELD

The present disclosure relates generally to electronic devices. More specifically, the present disclosure relates to electronic devices for defect detection.

BACKGROUND

Electronic devices have become smaller and more powerful in order to meet consumer needs and to improve portability and convenience. These advances have led to new applications for technology and new capabilities. Additionally, these advances in electronic devices have sparked an ever growing trend toward automation. One of the various aspects of automation includes inspection automation.

Various activities require some form of inspection. In the manufacturing context, for example, quality control may require inspection of various raw materials being used, inspection of processes and manufacturing steps and inspection of the final product. Inspection may help improve safety, enhance efficiency, improve quality, etc. In many situations, inspections are limited to manual inspections. Often the trained eye of an inspector may identify issues based on nearly imperceptible clues. However, while manual inspections may be very accurate, they may also be error prone. Manual inspection is often very repetitive as well as subjective to the knowledge and attention of the inspector. These factors may lead to errors (e.g., undetected defects). With the improvements in electronic device technology, hopes for an automated inspection solution have continued to increase.

However, inspection generally requires the ability to detect inconsistencies or defects without prior knowledge of what the defect may be. While this may be second nature for a human, this may be a very challenging task for an electronic device. As can be observed from this discussion, systems and methods for improving defect detection may be beneficial.

DETAILED DESCRIPTION

Figure 1:
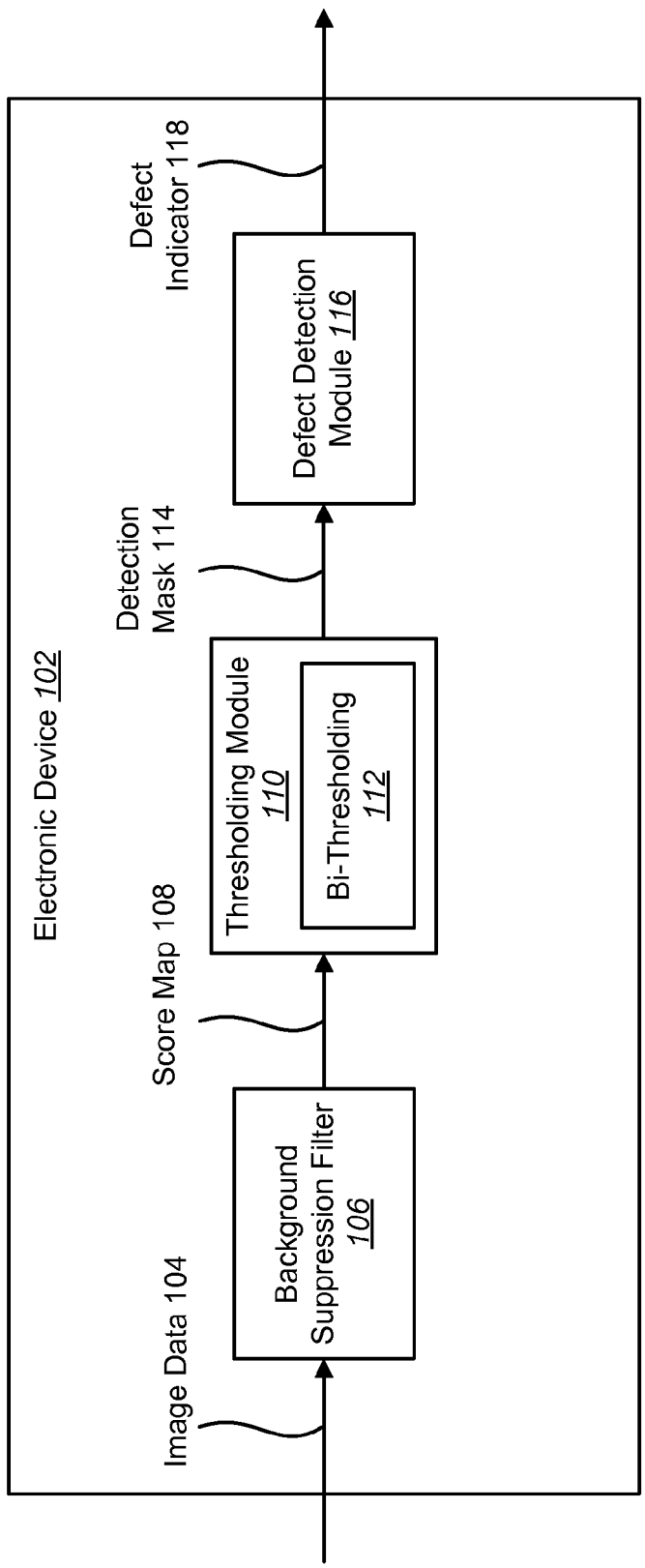
FIG. 1 is a block diagram illustrating one configuration of an electronic device in which systems and methods for defect detection may be implemented.

An electronic device configured for defect detection is described. The electronic device includes a processor and instructions stored in memory that is in electronic communication with the processor. The electronic device obtains image data. The electronic device also performs background suppression on the image data based on a transform of the image data to obtain a score map. The electronic device additionally applies thresholding to the score map to generate a detection mask. The thresholding includes bi-thresholding. The electronic device also detects any defects based on the detection mask. The electronic device further indicates any defects.

Applying bi-thresholding may include selecting any pixel with a score that exceeds a first threshold. Any pixel with a score that exceeds the first threshold may be a seed. Applying bi-thresholding may also include selecting any pixel with a score that exceeds a second threshold and that is located within a predetermined proximity to the seed. This selection may be based on a forward scan. Applying bi-thresholding may further include selecting any pixel with a score that exceeds the second threshold and that is located within the predetermined proximity to the seed. This selection may be based on a backward scan. Applying bi-thresholding may include applying locally adaptive thresholding.

The transform may include a two-dimensional discrete transform. The transform may a Discrete Fourier Transform, Walsh-Hadamard Transform, a transform based on singular value decomposition or a transform based on discrete polynomials.

The transform may include a one-dimensional discrete transform. The transform may be a Discrete Fourier Transform or a Walsh-Hadamard Transform. The one-dimensional discrete transform may be performed on each row of the image data. The one-dimensional discrete transform may be performed on each column of the image data. The transform may include at least one one-dimensional transform in combination with a two-dimensional transform.

Detecting any defects may include determining if the detection mask includes a line. Determining if the detection mask includes a line may include grouping any adjacent selected pixels from the detection mask to obtain one or more pixel blobs. Determining if the detection mask includes a line may also include sorting the one or more pixel blobs in descending order of area. Determining if the detection mask includes a line may additionally include determining a major axis and a minor axis of each pixel blob. Determining if the detection mask includes a line may also include selecting a pixel blob with a largest area and with a line ratio that exceeds a line threshold to obtain a selected pixel blob. Determining if the detection mask includes a line may additionally include selecting any additional pixel blob within a region. Determining if the detection mask includes a line may also include combining the selected pixel blob and any additional pixel blob to obtain a combined pixel blob area. Determining if the detection mask includes a line may additionally include determining a ratio of the combined pixel blob area over an area of unselected pixels in the detection mask. Determining if the detection mask includes a line may further include detecting the combined pixel blob area as a line if the ratio is above a threshold.

Performing background suppression on the image data may include obtaining reference image data. Performing background suppression may also include performing a forward transform on the image data to obtain an image data coefficient. Performing background suppression may additionally include performing the forward transform on the reference image data to obtain a reference image data coefficient. Performing background suppression may also include extracting information from the image data coefficient based on the reference image data coefficient to obtain extracted information. Performing background suppression may additionally include performing an inverse transform on the extracted information to obtain a feature map. Performing background suppression may further include generating the score map based on the feature map. The extracted information may include sign information or phase information. The forward transform may be a transform based on singular value decomposition. The forward transform may be a Walsh-Hadamard Transform.

A method for defect detection on an electronic device is also described. The method includes obtaining image data. The method also includes performing background suppression on the image data based on a transform of the image data to obtain a score map. The method additionally includes applying thresholding to the score map to generate a detection mask. Thresholding includes bi-thresholding. The method also includes detecting any defects based on the detection mask. The method further includes indicating any defects.

An electronic device configured for defect detection is also described. The electronic device includes a processor and instructions stored in memory that is in electronic communication with the processor. The electronic device obtains image data. The electronic device also performs background suppression on the image data based on a Walsh-Hadamard Transform of the image data to obtain a score map. The electronic device additionally applies thresholding to the score map to generate a detection mask. The electronic device also detects any defects based on the detection mask. The electronic device further indicates any defects.

A method for defect detection on an electronic device is also described. The method includes obtaining image data. The method also includes performing background suppression on the image data based on a Walsh-Hadamard Transform of the image data to obtain a score map. The method additionally includes applying thresholding to the score map to generate a detection mask. The method also includes detecting any defects based on the detection mask. The method further includes indicating any defects.

In various applications (e.g., fabrication, metal production, silicon wafer production, ceramic production, etc.), vision-based surface inspection and defect detection may be beneficial and/or necessary. An automated, high-speed, and high-accuracy solution for vision-based surface inspection may be desirable to facilitate (e.g., supplement, replace) subjective and repetitive manual inspections.

In general, there are four challenges in vision-based surface inspection. First, an image may be captured under varying conditions. For example, the image may (or may not) include texture, may include different texture types (e.g., grids, fingerprints) and/or may include different illumination conditions (e.g., low contrast, high contrast, highlights, etc.). Second, the defect or flaw regions themselves may be dramatically different in terms of appearance, shape, and/or size. Third, training samples and human interaction may be minimal or unavailable for automated settings. Fourth, vision-based surface inspection applications may require a defect detection algorithm to run in real time, with high accuracy and with a low memory footprint.

Known approaches to visual defect detection include statistical approaches, spectral approaches and model based approaches. Statistical approaches (e.g., co-occurrence matrix based approaches, Eigen-filter based approaches) are typically slow. Spectral approaches (e.g., Gabor filter approaches and wavelet transform for texture analysis approaches) and model-based approaches (e.g., Gaussian Markov Random Field approaches, model based clustering approaches) generally require at least one reference image. As a result, many of these approaches may not be suitable to various applications.

Accordingly, some configurations of the systems and methods disclosed herein may perform defect detection without prior knowledge (free from the use of training instances, for example). Additionally, the systems and methods disclosed herein may be fully automatic (no human interaction may be required, for example), fast and accurate, robust to defects of varying shapes and sizes, and generally applied to images under different conditions (e.g., with images of uniform or textured objects, under differing illumination conditions, etc.).

The systems and methods disclosed herein may have a complexity of $O[N \log(N)]$, where O denotes the complexity or order of a function and where N may be the number of pixels in the input image. This may allow application of the systems and methods in real time. For example, the systems and methods disclosed herein may perform defect detection on a 1024×1024 image in less than 200 milliseconds on a modern dual-core computing device. Additionally, the systems and methods disclosed herein may detect defects with a high true positive rate and a low false positive rate.

Furthermore, the systems and methods disclosed herein may detect defects of different shapes and sizes. Additionally, the systems and methods disclosed herein may detect defects of different shapes and sizes without any prior information about the image or about the defect shape, size, type or location. For instance, the defect may be a small speckle or a large region. In other examples, the defect may be a line or any other shape. The systems and methods disclosed herein may be applied to accurately locate the defect and may label the pixels corresponding to the defect region.

Furthermore, the systems and methods disclosed herein may be used to detect defects from different surfaces (e.g., metal, fabric, wood, ceramic, crystals, etc.). Additionally, the systems and methods disclosed herein may be generally applied to many texture types and backgrounds (e.g., uniform backgrounds). Moreover, the systems and methods disclosed herein may be robust over varying illumination conditions, such as shading, specular highlights (reflections) and low contrast.

The systems and methods disclosed herein may provide defect detection for a two-dimensional input image based on a transform (e.g., a two-dimensional discrete Walsh-Hadamard Transform (WHT), a transform based on Singular Value Decomposition, a two-dimensional Discrete Polynomial Transform) of the input image. Additionally or alternatively, the systems and methods disclosed herein may provide defect detection for a two-dimensional input image based on a discrete transform and thresholding (e.g., bi-thresholding and/or locally adaptive thresholding). Additionally or alternatively, the systems and methods disclosed herein may provide defect detection for a two-dimensional input image where a defect substantially has the shape of a line. For example, the systems and methods disclosed herein may be based on a one-dimensional discrete transform (e.g., Discrete Fourier Transform, WHT) performed along the rows of the image or along the columns of the image. The one-dimensional discrete transform may be combined with a procedure for line detection. In some configurations, the systems and methods disclosed herein may provide defect detection for a two-dimensional input image based on a combination of a two-dimensional discrete transform, a horizontal (e.g., for rows) one-dimensional discrete transform, a vertical (e.g., for columns) one-dimensional discrete transform and a procedure for line detection. Additionally or alternatively, the systems and methods disclosed herein may provide defect detection for a two-dimensional input image based on a discrete transform of the input image and the discrete transform (e.g., based on Singular value Decomposition) of a reference (model) image and combination thereof.

In one approach, phase information may be used to capture the locations of any events in image data. The phase information may be obtained using a phase only transform (PHOT) approach. For example, the phase information of the Discrete Fourier Transform (DFT) may be used for defect detection from the image. In the PHOT approach, a transform (e.g., DFT) may be applied to the input image to obtain discrete coefficients. Each coefficient may be divided by its magnitude, to extract the phase information from the coefficient. The inverse DFT may be applied to the phase information to produce a feature map. In summary this approach may be described by:

$$S = DFT^{-1}\left[\frac{DFT(X)}{|DFT(X)|}\right]$$

where X is the input image and S is the feature map. Gaussian smoothing may additionally be applied to the feature map. Mahalanobis distance may also be computed to standardize and/or normalize the data resulting in a distance map (e.g., score map). Mahalanobis distance may be represented as $$y = \frac{|x - \mu|}{\sigma}$$

where x is the particular sample value in the smoothed feature map, µ is the mean of the samples in the feature map, σ is the standard deviation of the samples in the feature map and y is the score for that particular x in the score map. Computing Mahalanobis distance in this case may be equivalent to computing a standard score for each pixel. Binarization (e.g., thresholding) may then be performed on the score map. For example, the binarization may be based on a threshold of 4.

The PHOT approach may achieve good results on some images. PHOT may be very fast (e.g., the computational complexity is O[N log(N)], where N is the number of pixels in the image).

In one approach, sign information may be used to capture the locations of any events in image data. The sign information may be obtained using an image signature (IS) approach for saliency detection. The IS approach may be a similar to the PHOT approach. Compared with PHOT, IS utilizes the Discrete Cosine Transform (DCT) instead of the DFT. As a result, the sign information is used instead of the phase information. Computing the feature map is described by:

$$S = DCT^{-1}\left[\frac{DCT(X)}{|DCT(X)|}\right]$$

where X is the input image and S is the feature map.

The IS approach achieves similar results as the PHOT approach in defect detection. PHOT and IS may achieve good results on some images. However, neither approach may detect line shaped defects. This is because, in the Fourier domain, the spectrum of a uniform background is a delta function, the spectrum of the patterned background is groups of delta functions with different shifts, the spectrum of a line is still a line and the spectrum of a delta function is flat over the whole Fourier domain. Hence, removing variations of the magnitude in the Fourier domain may result in suppressing all the objects above, except the delta function (e.g., defect). Hence, if the defect is line-shaped, this defect will also be suppressed in the feature map.

To overcome this issue, a different discrete transform may be used. In other words, based on the properties of different transforms, this issue may be solved. Additionally and/or alternatively, this issue may be solved by extending the basic defect detection algorithms.

Two-dimensional discrete transforms may be divided into four categories, according to the basis function used by the transform. The first category includes basis functions where the basis is a sinusoid wave(s) (e.g., Discrete Fourier Transform (DFT), Discrete Cosine Transform (DCT), Discrete Sine Transform (DST)). The second category includes basis functions where the basis only contains the values +1 and −1 (e.g., Walsh-Hadamard Transform (WHT)). The third category includes basis functions where the basis is computed from the image itself by Singular Value Decomposition (SVD) (e.g., Karhunen-Loeve transform (KLT)). The fourth category includes basis functions where the basis is computed from discrete polynomial equations (e.g., Discrete Chebichef Transform (DchebT), Discrete Krawtchouk Transform (DKrawT)).

Transforms in the sinusoid family utilize the sinusoid wave as the basis function. The difference is that the DFT will create complex coefficients, while the DCT and the DST create real-valued coefficients given real-valued input data. The basis of the DCT is a cosine wave and the basis of DST is a sine wave. A fast transform may also be used. For example, the Fast Fourier Transform (FFT) algorithm, whose computation complexity is O[N log(N)], where N is the number of pixels in the image may be used.

The basis function of the Walsh-Hadamard Transform (WHT) is the Hadamard matrix, which can be constructed iteratively as $$B_1 = \begin{bmatrix} 1 & 1 \\ 1 & -1 \end{bmatrix} \text{ and } B_n = \begin{bmatrix} B_{n-1} & B_{n-1} \\ B_{n-1} & -B_{n-1} \end{bmatrix},$$

where B represents the Hadamard matrix and n represents the order of the Hadamard matrix. As a result, the input data may be padded so that width and height become a power of 2. By utilizing a divide and conquer algorithm, the complexity of WHT is also O[N log(N)], where N is the number of pixels in the image. However, WHT is faster than DFT (and faster than DCT and DST) in practice, due to the simpler basis functions.

Since the transform can be performed by addition and subtractions, multiplications can be mostly avoided, resulting in faster processing. Hence, the use of WHT provides the benefit of faster processing. Also, the WHT may be more suitable to images with strong gradients, compared with the DFT (and compared with DCT and DST).

The basis of the Karhunen-Loeve Transform (KLT) may be computed from the input image with Singular Value Decomposition (SVD). In this case, the two-dimensional input image data X is treated as a two-dimensional matrix. This may be represented as $U\Sigma V^T \leftarrow X$ and $S(X)=U^T\text{sign}(\Sigma)V$. SVD factors the input image data X into matrices U, $\Sigma$ and V, where U contains the left singular vectors of X, V contains the right singular vectors of X, and $\Sigma$ contains the singular values of X on the diagonal. After the SVD decomposition is obtained, the feature map may be obtained by reconstruction, using only the sign information of the singular value matrix $\Sigma$. As a result, the basis is adaptive to the input image. The computational complexity is $O(MN^2)$ where the input image is M×N and M>N, where M and N are dimensions of the input image (in pixels, for example).

The basis of a discrete polynomial transform (e.g. Chebyshev, Krawtchouk, Hahn or Poisson-Charlier) is computed from various discrete orthogonal polynomials. Particular focus may be given to the performance of the Chebyshev (DChebT) and Krawtchouk (DKrawT) transforms. However, due to the numerical instabilities of computing the discrete polynomial basis, computation may be constrained to use a relatively small basis (e.g., 64×64). In this scenario, the image may need to be rescaled or divided into smaller patches. Both schemes degrade the performance of discrete orthogonal polynomials transforms. The computational complexity is $O(M^2N)$, where the input image is M×N and M>N.

In one configuration, the systems and methods disclosed herein may include a pre-processing step, a background suppression step, a thresholding step and a post-processing step. The pre-processing step may perform image down-sampling, de-noising or contrast enhancement on the input image. The background suppression step may include five sub steps. The first substep may be to apply a two-dimensional discrete transform (e.g., DFT) to the input image. The second substep may be to extract the sign/phase information from the coefficients of the transform (e.g., point-wise or coefficient-by-coefficient division by the magnitude). The third substep may be to apply the reverse discrete transform on the sign/phase information to obtain the feature map. The fourth substep may be to apply Gaussian filtering or other smoothing (e.g., where the filter kernel radius is 5 and Gaussian standard deviation is 2.5). The fifth substep may be to convert the smoothed feature map into a score map by computing Mahalanobis distance (e.g., computing the standard score at each pixel). The thresholding step may include generating a binarized mask from the score map. The post-processing step may include using blob analysis to improve the binarized mask.

The thresholding step may include thresholding with various thresholding methods (e.g., fixed thresholding, dynamic thresholding, Otsu's algorithm, maximal mutual information thresholding, etc.). A fixed threshold may be a fixed value (e.g., 4). A dynamic threshold may be computed according to a fixed percentage (e.g., the threshold is chosen, such that a certain percentage of pixels are kept). This may assume that a known ratio of pixels belongs to defect region. This approach may fail if the input image is defect-free. Otsu's algorithm may be a classical algorithm for computing threshold from a histogram. This approach finds the threshold that maximizes the cross-variance between the histogram above the threshold and that below threshold. Maximal mutual information thresholding may treat the histogram as a probability distribution and may find the threshold that maximizes the mutual information between the histogram above the threshold and that below threshold. However, none of these approaches may achieve good and robust results for some defect detection applications. For example, the threshold computed with the Otsu algorithm is so small that a high false detection rate results.

It may be noted that a high peak (corresponding to a defect detection with high confidence) in the score map may be surrounded by a deep valley. Based on this observation, a bi-threshold algorithm may be beneficial. This bi-thresholding algorithm may receive a high threshold, a low threshold and a mapping of values as inputs and may output a detection mask as an output.

The bi-thresholding algorithm may begin by doing binarization with the high threshold. Any pixel that exceeds the high threshold is selected and referred to as a seed. The bi-thresholding algorithm may scan from the top-left to the bottom-right, selecting any pixel that has a score larger than the low threshold and that is connected to any seed. The bi-thresholding algorithm may then scan from the bottom-right to the top-left, selecting any pixel that has a score larger than the low threshold and that is connected to any seed. In some configurations, X is the score map and Y is the output binarized mask. For example, the high threshold may be set as hi=max[4,max(X)] for DFT and hi=max[5,max(X)] for WHT, where 4 (or 5 for WHT) is used to reject defect free images. In one example, the low threshold may be set as Lo=1.6 for all 3 transforms. Bi-thresholding may have a better result than the fixed thresholding approach. For example, the bi-thresholding approach may detect the defect more completely. The use of the bi-thresholding technique provides the benefit of an improved defect detection performance. Specifically, it enables achieving a higher true positive rate (reducing miss detections) while keeping the false positive rate low (reducing false detections).

In one configuration, locally adaptive thresholding may be applied to further improve performance. For example, when applying the high threshold, a locally adaptive threshold may be used for each block of the image (e.g., score map), shown as $$y(i, j) = \begin{cases} 0 & x(i, j) > hi(i, j) \\ 1 & \text{otherwise,} \end{cases}$$

where i and j represent coordinates for a particular location in a two-dimensional mapping of values, where x(i,j) represents a score in a score map for location (i,j), where hi(i,j) is the threshold for location (i,j) and where y(i,j) represents a binary value in a detection mask for location (i,j). The same scheme may be used for the low thresholding method. This procedure may be equivalent to rescaling the input image values:

$$y(i, j) = \begin{cases} 0 & \frac{x(i, j)}{hi(i, j)} > 1 \\ 1 & \text{otherwise.} \end{cases}$$

This approach may achieve the same result.

In one configuration, the image may be divided into 16×16 patches. For each patch, the local threshold may be computed as 0.7 of the local maximum. In addition, this results in a lower bound for the local threshold, which may be used to suppress the false detection in defect-free regions. The lower bound may be computed as 0.15 of the global maximum (e.g., the maximum of the whole image). The local threshold may further be smoothed with a Gaussian kernel, whose size is 3×3 and sigma is 0.5.

Although the 2D DFT, WHT and/or KLT with a bi-thresholding approach may achieve good results in many cases, they may all still have a problem with the detection of line-shaped defects. This problem with detection of line-shaped defects may be especially apparent for line-shaped defects with a horizontal or a vertical direction. Analysis suggests that the problem originates from the background suppression filter with the two-dimensional transform. Unfortunately, changes of transforms may not be able to solve this problem.

However, where the line-shaped defect is in the vertical direction, it may be viewed as a delta function in the horizontal direction (e.g., in each row). This indicates that, by taking a horizontal one-dimensional transform along each row of the input image, a line-shaped defect in the vertical direction may be detected. For line-shaped defects in the horizontal direction, a one-dimensional transform may be taken along each column (in vertical direction). However, as there is no one-dimensional transform for KLT, the discussion of one-dimensional transforms may be limited to DFTs and WHTs in the following sections (although alternative one-dimensional transforms may be possible).

In one configuration, a one-dimensional transform on each column of the image may successfully detect the line-shaped defect in the horizontal direction and vice versa. However, it is noted that the direction in which the one-dimensional transform is taken may be important. For example, with the correct direction, a line-shaped defect may be detected. However, an incorrect direction may result in a false detection or a missed detection.

In one example, a one-dimensional transform on each column of the image may successfully detect a line-shaped defect in the horizontal direction, while a one-dimensional transform on each row may not detect the line-shaped defect in the horizontal direction. Similarly, a one-dimensional transform on each row of the image may successfully detect a line-shaped defect in the vertical direction, while a one-dimensional transform on each column may not detect the line-shaped defect in the vertical direction.

In one configuration, the systems and methods disclosed herein may utilize a one-dimensional transform. The utilization of one or more one-dimensional transforms may allow for the detection of line-shaped defects. The timing for when to apply a one-dimensional transform and the direction that the one-dimensional transform should be taken, may be important considerations for detection of line-shaped defects.

In one example, it may be assumed that there is only one dominant line-shaped defect in the input image. The term "dominant" may require that the area of any line-shaped defect occupy a large (e.g., 70%) ratio of the selected pixels in the binarized mask. In another example, it may be assumed that there may be more than one (e.g., dominant) line-shaped defect in the input image.

In one configuration, the systems and methods disclosed herein describe a line detection algorithm. The line detection algorithm may receive a binarized mask as an input and may output a modified mask based on one or more line detections. In one configuration, the line detection algorithm may have seven steps. The first step may include extracting the connected components in the defect mask image as defect blobs. The second step may include sorting the blobs in a descending order of area. The third step may include computing the major axis and the minor axis of each blob. The fourth step may include picking the largest blob whose ratio between the major axis and the minor axis is above a threshold (e.g., 3 or a threshold sufficient to indicate that the area is potentially like a line). The fifth step may include iterating through each of the other blobs, and selecting those blobs that are "near" to the selected blob along the major axis (e.g., within a given distance of the major axis). The sixth step may include computing the ratio of all of the selected blob areas over the non-zero area in the image. The seventh step may include determining if the ratio is above a threshold (e.g., 70%). If the ratio is above the threshold, then the selected blobs may be saved and treated as one line. Otherwise, the selected blobs may be unselected.

Systems and methods associated with computing the distance between the blobs may vary depending on the application. In one configuration, the distance between a blob and a selected blob may be based on a virtual line that is orthogonal to the major axis of the selected blob and that extends from the major axis to the blob.

In one configuration, the systems and methods disclosed herein may utilize a one-dimensional transform in combination with a two-dimensional transform. For DFT and WHT transforms, the overall complexity of a procedure utilizing a combination of one-dimensional and two-dimensional transforms may be O[N log(N)], where N is the number of pixels in the input image. In one configuration, the combination of one or more one-dimensional transforms and a two-dimensional transform may be beneficial to performance.

The systems and methods disclosed herein may be evaluated by computing the true positive rate (TPR) and false positive rate (FPR). A bounding box may be computed for each connected component (e.g., blob) for both the ground truth and the detection mask. The true positive rate may be the ratio of area that overlaps between the bounding boxes in the ground truth and the bounding boxes in the detection mask over the area of the bounding boxes in the detection mask. The false positive rate may be the ratio of area that overlaps between the bounding boxes in the negative ground truth and the bounding boxes in the detection mask over the area of the bounding boxes in the negative detection mask.

Table (1) below describes one example of statistics of the TPR and FPR for DFT and WHT. The statistics for TPR (Col. 3 and 5) and FPR (Col. 2 and 4) are illustrated with respect to DFT (Col. 2 and 3) and WHT (Col. 4 and 5). In Table (1), "standard deviation" is abbreviated as STD for convenience.

TABLE (1)

| Statistics | Transform | | | |
| --- | --- | --- | --- | --- |
| | DFT | | WHT | |
| | FPR | TPR | FPR | TPR |
| Mean | 0.0147 | 0.6080 | 0.0151 | 0.5911 |
| STD | 0.0330 | 0.2950 | 0.0297 | 0.2953 |

In one configuration, the systems and methods disclosed herein may be extended to work with input images that may include substantial foreground objects in addition to a background pattern. Accordingly, in one configuration, the systems and methods disclosed herein may require the use of one defect free image containing the foreground object as a "reference" or "model" image. For DFT and WHT, a first step may include computing the transform coefficients or spectrum of the reference image $M_R = DT(X_R)$ and the transform coefficients of the input image $M_I = DT(X_I)$, where "DT" is the forward discrete transform for DFT or WHT, $X_R$ and $X_I$ are the respective reference image and input image and $M_R$ and $M_I$ are the transform coefficients for the respective reference image and the input image. A second step may include applying an inverse transform with the obtained sign or phase information as $$S = IDT\left(\frac{M_I}{|M_R|}\right),$$

where "IDT" is the corresponding inverse transform for DFT or WHT. The other steps may be similar to those described previously above. Variations of this approach are described by the following:

$$S = IDT\left(\frac{M_I}{|M_I|} \cdot \frac{M_R}{|M_R|}\right),$$

where the dot operator indicates an element-by-element multiplication, $$S = IDT\left(\frac{M_I}{|M_I|} - \frac{M_R}{|M_R|}\right) \text{ or } S = IDT\left(\frac{M_I - M_R}{|M_I - M_R|}\right).$$

Since the spectrum image $M_R$ captures the foreground object and background information of the reference image, if the reference image and input image share the same foreground object and background pattern, we expect the above steps can remove both the foreground object and background information in the input image. This approach may be referred to as "Background Suppression Filter with Reference Image", which may be combined with both a two-dimensional transform and a one-dimensional transform for DFT and WHT.

A transform based on SVD or a KLT transform may use the reference image, as follows: $U_R \Sigma_R V_R^T \leftarrow X_R$, $S(X) = U_R \text{sign}(U_R^T X_I V_R) V_R^T$, where $X_R$ is the reference image, $X_I$ is the input image, $U_R$ contains the left singular vectors of $X_R$, $V_R$ contains the right singular vectors of $X_R$, $\Sigma_R$ contains the singular values of $X_R$ on the diagonal and superscript $^T$ denotes transpose. Other variations of this approach are described by the following:

$$S(X) = U_R \frac{(U_R^T X_I V_R)}{|U_R^T X_R V_R|} V_R^T, S(X) = U_R \left[\frac{(U_R^T X_I V_R)}{|U_R^T X_I V_R|} - \frac{(U_R^T X_R V_R)}{|U_R^T X_R V_R|}\right] V_R^T \text{ or}$$

$$S(X) = U_R \frac{(U_R^T X_I V_R - U_R^T X_R V_R)}{|U_R^T X_I V_R - U_R^T X_R V_R|} V_R^T.$$

It may be noted that the WHT may only utilize a base matrix whose size is of order 2. Therefore, the input image may need to be padded to dimensions that are powers of 2. However, as the WHT utilizes different basis matrix on left and right side of the input image, so the width and the height of the input image may be padded independently, which may dramatically reduce the size of memory and the computational time required.

It may also be noted that for some transforms (e.g., DFT or other transforms) there may be an aliasing effect when an image (e.g., input image and/or reference image) is padded. In one configuration, the aliasing effect may be especially obvious on the boundary. A comparison of several padding methods (e.g., mirroring, replicating the boundary and padding with 0) indicates that replicating the boundary may result in the best performance. In one configuration, the boundary of the score map (before thresholding) may be set to zero, where the width of the boundary is equal to the radius of the Gaussian smoothing kernel (e.g., 5). It is noted that the mean and the standard deviation may be computed without considering the images on the boundary, when Mahalanobis distance is computed.

It may further be noted that in some configurations, the systems and methods disclosed herein may be extended for application to discrete transforms of three-dimensional image and video data for detection of salient regions (e.g., volumes in three-dimensional image data) as well as salient space-time events (in two-dimensions plus time video data, for example). In particular, application of the DFT and/or WHT to multi-dimensional (e.g., three-dimensional) image data and video data is anticipated by the inventors. In the case of video, this may include defining a temporal window size (e.g., a group of frames), over which to apply a discrete transform in the temporal direction.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of an electronic device 102 in which systems and methods for defect detection may be implemented. It should be noted that one or more of the elements illustrated as included within the electronic device 102 may be implemented in hardware, software or a combination of both. For example, the electronic device 102 may include a thesholding module 110, which may be implemented in hardware, software or a combination of both. For instance, the thresholding module 110 may be implemented as a circuit, integrated circuit, application-specific integrated circuit (ASIC), processor in electronic communication with memory with executable instructions, firmware, field-programmable gate array (FPGA), etc., or a combination thereof.

The electronic device 102 may include a background suppression filter 106. One or more of the approaches for background suppression described above may be performed by the background suppression filter 106 in some configurations. The background suppression filter 106 may receive image data 104 and may output a score map 108 based on the image data 104. In one configuration, image data 104 may comprise pixel values from an image. For example, the image data 104 may correspond to an array of values (e.g., pixel values). The background suppression filter 106 may perform background suppression (which is described in more detail below) on the image data 104 to obtain the score map 108. In one configuration, the score map 108 may be a mapping of scores given to each pixel based on the background suppression. The background suppression filter 106 may filter (e.g., perform background suppression) based on a transform (e.g., a discrete transform) of the image data 104. For example, in one configuration, the background suppression filter 106 may extract event information (e.g., phase information, sign information) from the image data 104 by performing a transform on the image data 104, performing an operation on the resulting coefficients and performing an inverse transform on the results of the operation. The score map 108 may be based on the inverted transform of the results of the operation.

In some configurations, the thresholding module 110 may be coupled to the background suppression filter 106. The thresholding module 110 may receive the score map 108 from the background suppression filter 106. The thresholding module 110 may perform thresholding on the score map 108 to obtain a detection mask 114. Examples of thresholding include fixed thresholding (where a threshold is a fixed value such as 4 as may be used in PHOT for defect detection for paper, for example), percentage thresholding (where a threshold is selected for keeping a certain percentage of pixels, for example), Otsu thresholding (where a threshold is determined from a histogram threshold that maximizes cross variance between the histogram above and below the threshold, for example) and maximal mutual information thresholding. In some configurations, the thresholding module 110 may perform bi-thresholding 112 (which is described in greater detail below). In one example, the thresholding module 110 may binarize (using bi-thresholding 112, for example) the score map 108 into a detection mask 114. For example, the detection mask 114 may be a mapping of either selected pixels (corresponding to a potential defect, for example) or unselected pixels (corresponding to a suppressed background, for example).

The electronic device 102 may also include a defect detection module 116. In some configurations, the defect detection module 116 may be coupled to the thresholding module 110. The defect detection module 116 may receive the detection mask 114 from the thresholding module 110. The defect detection module 116 may output a defect indicator 118 based on the detection mask 114. For instance, the defect detection module 116 may output a defect indicator 118 if a defect is detected. In one configuration, the defect indicator 118 may indicate the pixel locations corresponding to a detected defect. One or more of the approaches for defect detection described above may be performed by the defect detection module 116 in some configurations.

Figure 2:
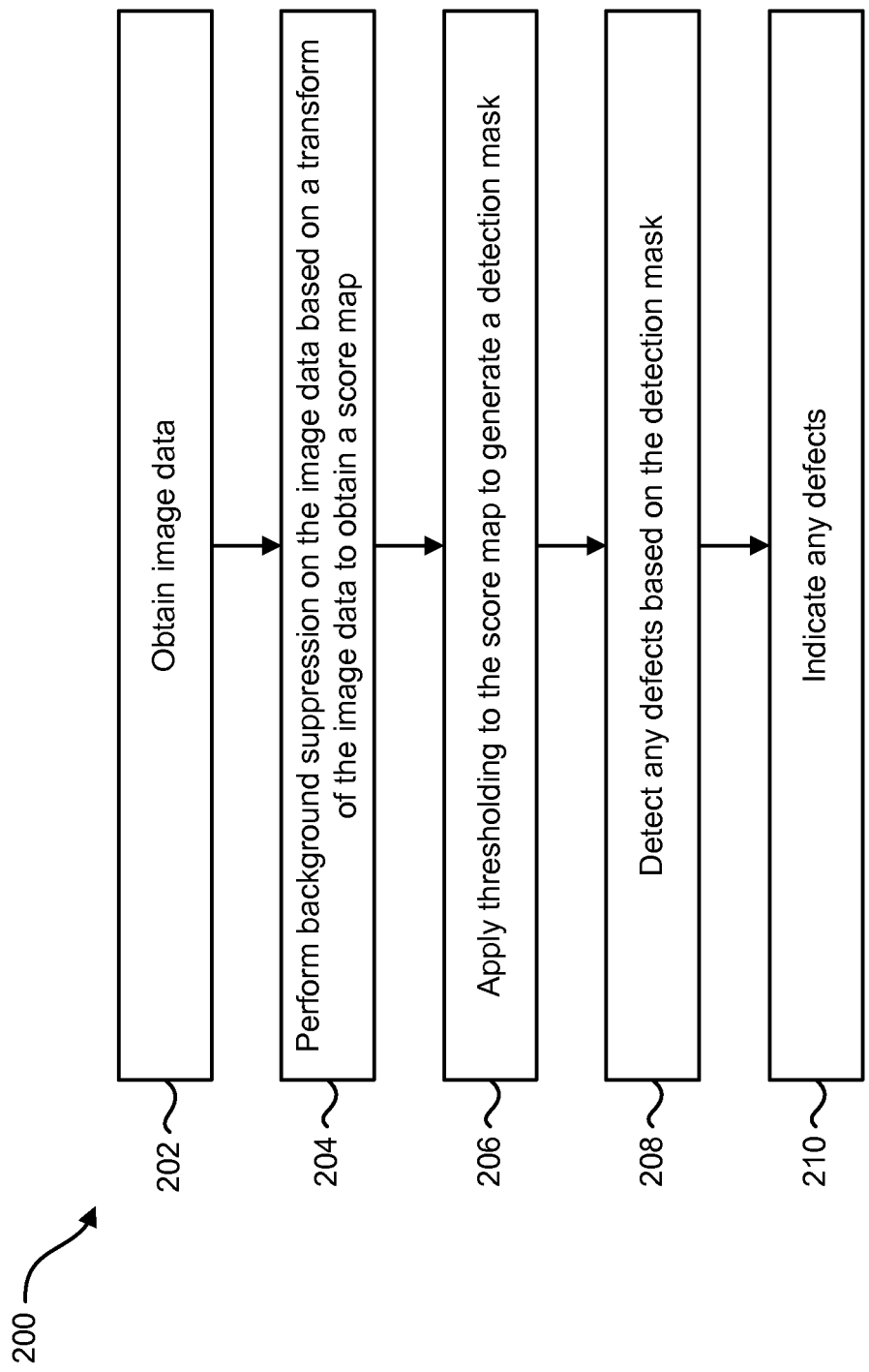
FIG. 2 is a flow diagram illustrating one configuration of a method for defect detection on an electronic device.

FIG. 2 is a flow diagram illustrating one configuration of a method 200 for defect detection on an electronic device 102. The electronic device 102 may obtain 202 image data 104. For example, the electronic device 102 may obtain 202 an array of values (e.g., pixel values corresponding to an image). In one example, the electronic device 102 may obtain 202 raw image data (e.g., image data 104). In some configurations, for instance, the electronic device 102 may obtain 202 image data 104 from an image sensor that is coupled to or included within the electronic device 102.

The electronic device 102 may perform 204 background suppression (by applying a background suppression filter 106, for example) on the image data 104 based on a transform of the image data 104 to obtain a score map 108. For example, performing 204 background suppression may include extracting phase and/or sign information from the image data 104 and creating a score map 108 based on the extracted phase and/or sign information. One or more of the approaches for background suppression described above may be performed 204 by the electronic device 102 in some configurations.

The electronic device 102 may apply 206 thresholding to the score map 108 to generate a detection mask 114. For example, applying 206 thresholding may result in a binary map of values (e.g., values that exceed the threshold and values that don't exceed the threshold). For instance, the detection mask 114 may be a binarized score map 108. In some configurations, applying 206 thresholding comprises applying 206 bi-thresholding 112 to the score map 108 to generate the detection mask 114. For example, the electronic device 102 may apply 206 bi-thresholding 112 by thresholding with two different thresholds (e.g., a high threshold and a low threshold) as described above.

The electronic device 102 may detect 208 any defects based on the detection mask 114. For example, in one configuration, each selected value in the detection mask 114 may correspond to a defect. In this example, the electronic device 102 may detect 208 a defect for each group of connected (e.g., adjoining, adjacent) selected values in the detection mask 114. For instance, a group of connected selected values in the detection mask 114 may comprise one defect and may be detected 208 accordingly. It should be noted that in some instances, no defects may be detected 208. The electronic device 102 may detect 208 any defects in accordance with one or more of the approaches for defect detection described above in some configurations.

The electronic device 102 may indicate 210 any defects (that are detected 208, for example). In some configurations, the electronic device 102 may indicate 210 whether any defect was detected. The electronic device 102 may indicate additional information regarding one or more detected defects. For instance, the electronic device 102 may indicate various parameters about a defect (e.g., the location of the defect, the pixel values belonging to the defect region, the border belonging to the defect region, etc.). For instance, if no defects are detected 208 then no defects may be indicated 210. In contrast, if multiple defects are detected 208, then one or more defect indications 210 may be made (one defect indicator 118 for each defect or one defect indicator 118 for multiple defects, for example). In one configuration, the electronic device 102 may indicate 210 any defects with a defect indicator 118.

Figure 3:
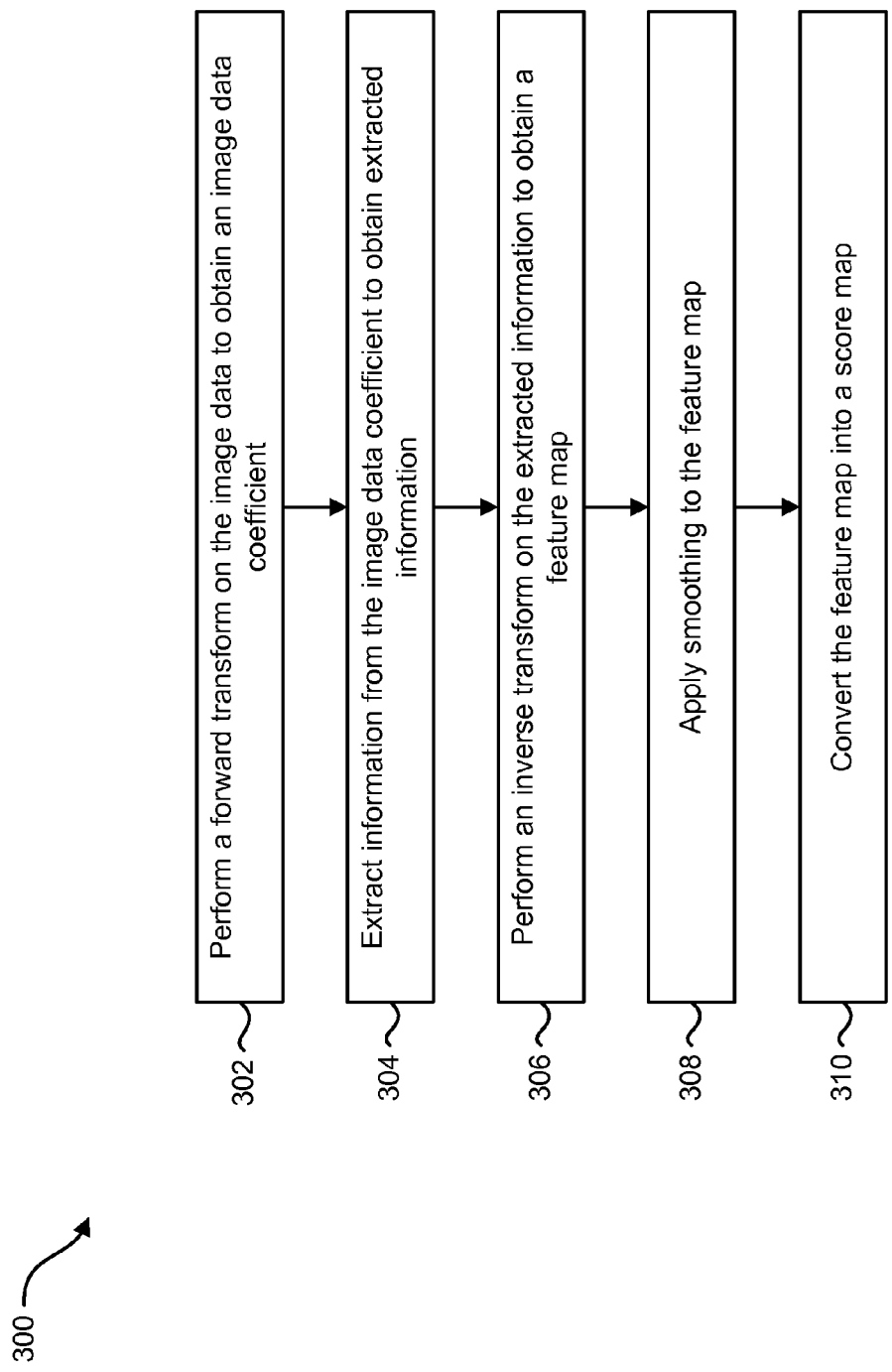
FIG. 3 is a flow diagram illustrating one configuration of a method for performing background suppression on an electronic device.

FIG. 3 is a flow diagram illustrating one configuration of a method 300 for performing background suppression on an electronic device 102. The electronic device 102 may perform 302 a forward transform (e.g., discrete transform) on the image data 104 to obtain an image data coefficient. For example, the forward transform may be a two-dimensional transform (e.g., DFT, DCT, DST, WHT, SVD based, KLT, DChebT, DKrawT, and the like in two dimensions). In another configuration, the forward transform may be a one-dimensional transform (e.g., DFT, WHT, and the like in one dimension). The forward transform may output one or more image data coefficients. An image data coefficient may be a transform coefficient resulting from the forward transform. A transform coefficient may vary based on the transform that is used. In one configuration, the electronic device 102 may optionally perform a forward transform on reference image data to obtain a reference image data coefficient.

The electronic device 102 may extract 304 information from the image data coefficient to obtain extracted information. For example, the electronic device 102 may extract 304 information from the image data coefficient by dividing the image data coefficient by the magnitude of the image data coefficient. In this example, if the forward transform is a DFT, then the extracted information may be phase information. However, if the forward transform is a DCT, then the extracted information may be sign information. In another example, the electronic device 102 may extract 304 information from the image data coefficient by dividing the image data coefficient by the magnitude of a reference image data coefficient.

The electronic device 102 may perform 306 an inverse transform on the extracted information to obtain a feature map. For example, the inverse transform may be the inverse transform to the forward transform that was performed 302.

For instance, the forward transform may transform the image data from the spatial domain to the frequency domain and the inverse transform may transform the extracted information from the frequency domain to the spatial domain. For instance, the inverse transform may be the inverse (e.g., reverse) of the forward transform.

The electronic device 102 may apply 308 smoothing to the feature map. For example, the electronic device 102 may apply 308 Gaussian smoothing to the feature map. For example, applying 308 smoothing may comprise creating one or more approximate functions that capture important patterns in a data set while removing noise.

The electronic device 102 may convert 310 the feature map into a score map. For example, converting 310 the feature map into a score map may be based on a determination of a Mahalanobis Distance for each value (e.g., pixel value). In another example, converting 310 the feature map into a score map may be based on some other criteria.

Figure 4:
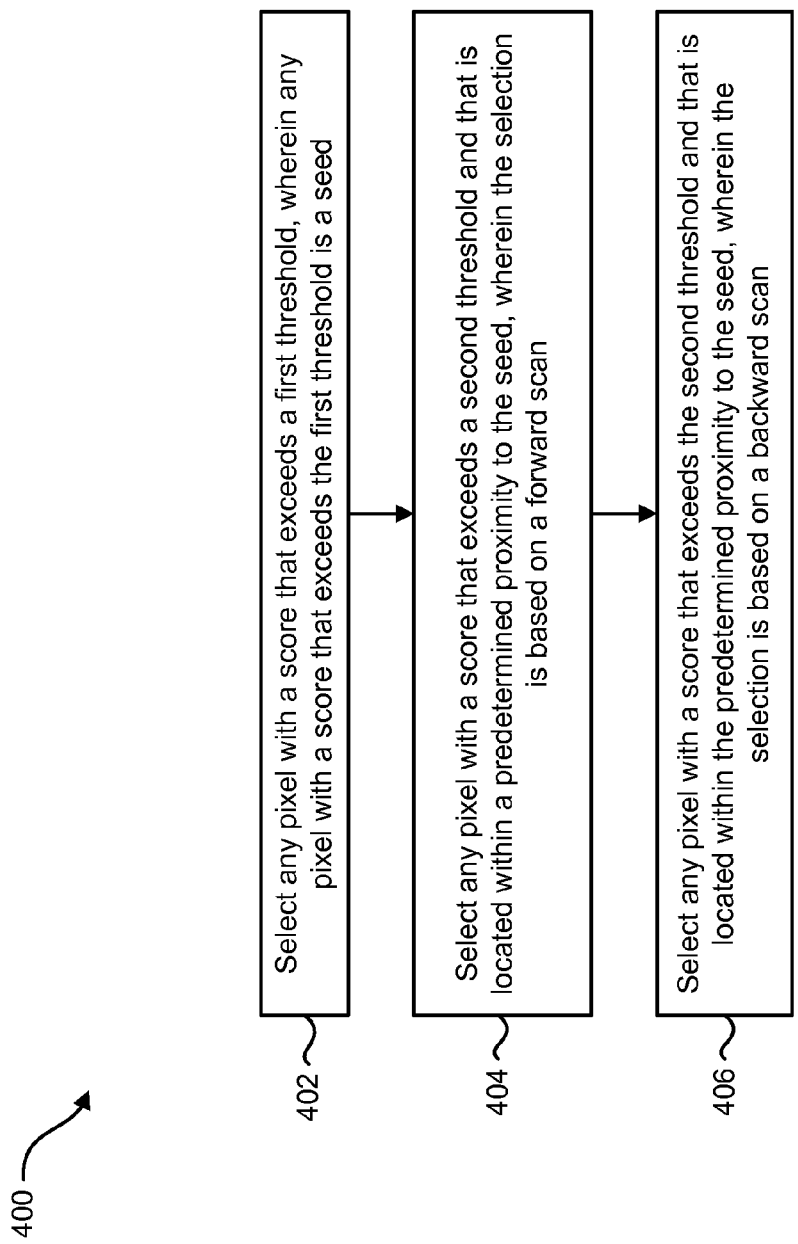
FIG. 4 is a flow diagram illustrating one configuration of a method for bi-thresholding on an electronic device.

FIG. 4 is a flow diagram illustrating one configuration of a method 400 for bi-thresholding on an electronic device 102. For example, bi-thresholding may include thresholding with two or more different thresholds. For instance, a high threshold (e.g., a first threshold) and a low threshold (e.g., a second threshold) may be utilized in bi-thresholding. In one example (e.g., for a DFT transform), the high threshold may be 4 and the low threshold may be 1.6. In another example (e.g., for a WHT transform), the high threshold may be 5 and the low threshold may be 1.6. Various thresholds may be chosen based on the application and any transform being used.

The electronic device 102 may select 402 any pixel (e.g., zero, one or more pixels) with a score (e.g., value) that exceeds a first threshold (e.g., high threshold). For example, the electronic device 102 may scan each pixel and determine if the pixel score exceeds the first threshold. Any pixel with a score that exceeds the first threshold may be considered a seed. It should be noted that the term "exceed" and variations thereof may denote "greater than" or "greater than or equal to," for example, depending on the configuration of the systems and methods disclosed herein.

The electronic device 102 may select 404 any pixel (e.g., zero, one or more pixels) with a score (e.g., value) that exceeds a second threshold (e.g., low threshold) and that is located within a predetermined proximity to the seed. For example, being located within a predetermined proximity may comprise being connected (e.g., adjoining, adjacent, etc.) to a seed. The selection 404 may be based on a forward scan of the pixel values with a low threshold. For example, a forward scan may proceed from a first corner (e.g., top-left) to a second corner (e.g., bottom-right) that is opposite to the first corner).

The electronic device 102 may select 406 any pixel (e.g., zero, one or more pixels) with a score (e.g., value) that exceeds a second threshold (e.g., low threshold) and that is located within a predetermined proximity to the seed. For example, being located within a predetermined proximity may comprise being connected (e.g., adjoining, adjacent, etc.) to a seed. The selection 406 may be based on a backward scan of the pixel values with a low threshold. For example, a backward scan may proceed from the second corner (e.g., bottom-right) to the first corner (e.g., top-left).

In some configurations, thesholding may additionally (in combination with bi-thresholding) or alternatively comprise locally adaptive thresholding for each block (image divided into 16×16 blocks, for example) of the image. For instance, locally adaptive thresholding may comprise performing thresholding on multiple blocks that are subsets of an image.

Figure 5:
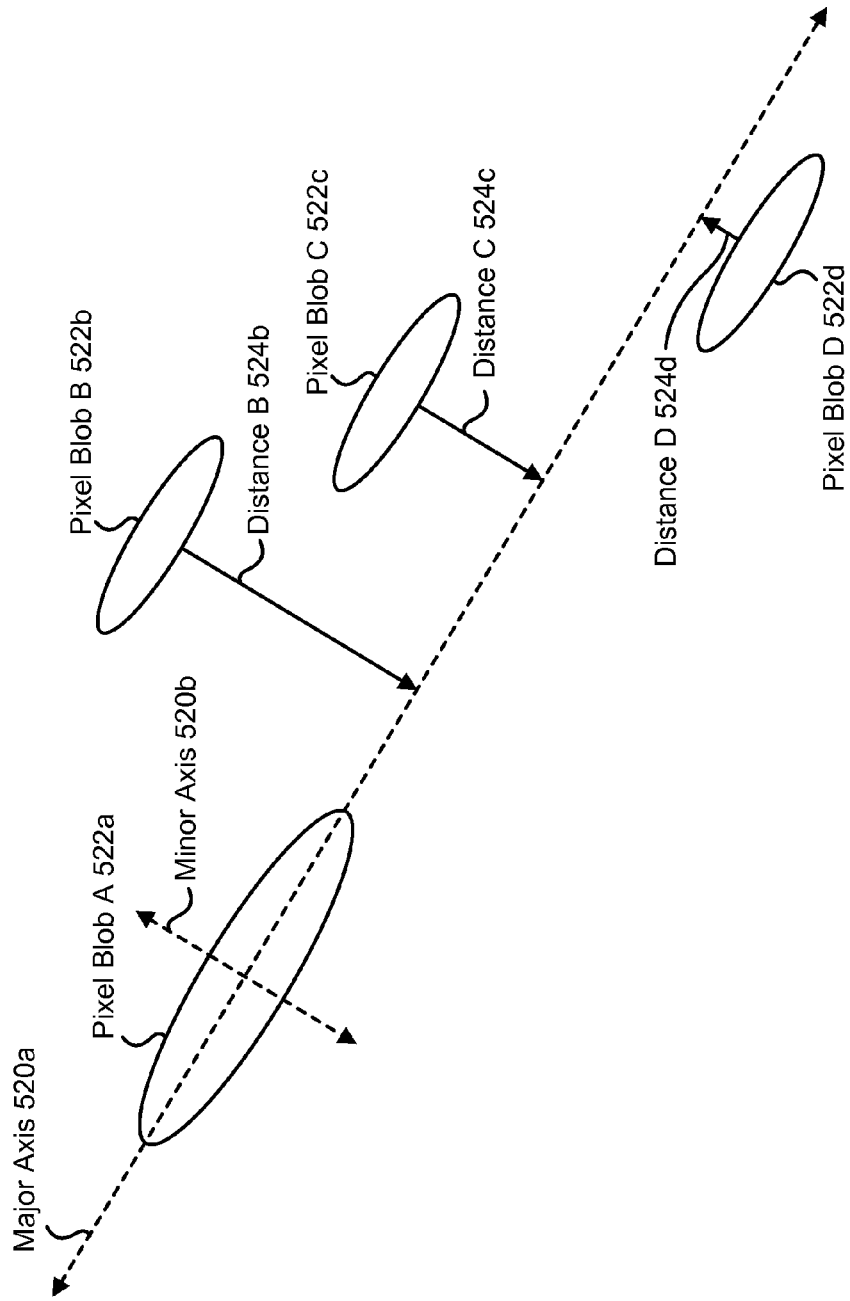
FIG. 5 is a diagram illustrating one example how the distance between pixel blobs might be computed when performing line detection.

FIG. 5 is a diagram illustrating one example how the distance between pixel blobs might be computed when performing line detection. Pixel blobs 522a-d may be groupings of connected pixels in a detection mask 114. Pixel blob A 522a may have a major axis 520a and a minor axis 520b. As illustrated in FIG. 5, the major axis 520a may correspond to a longest dimension (e.g., diameter) of pixel blob A 522a and the minor axis 520b may correspond to a shortest dimension (e.g., diameter) of pixel blob A 522a. Although not shown, pixel blobs 522b-d may each also have a major axis and a minor axis. Pixel blobs 522b-d may each be separated from pixel blob A 522a by a corresponding distance 524b-d. Distances 524b-d may be measured from the corresponding pixel blob 522b-d (e.g., from the center of mass) to the major axis 520a of a selected pixel blob (e.g., pixel blob A 522a). For example, pixel blob B 522b may be distance B 524b away from the major axis 520a of pixel blob A 522a. Similarly, pixel blob C 522c may be distance C 524c and pixel blob D 522d may be distance D 524d away from the major axis 520a. In one configuration, pixel blob B 522b may be too far away (e.g., distance B 524b is too large) from pixel blob A 522a to be determined (e.g., designated, computed, etc.) as part of a line. However, pixel blob C 522c and pixel blob D 522d may be near enough (e.g., corresponding distance C 524c and distance D 524d are small enough) to pixel blob A 522a to be determined (e.g., designated, computed, etc.) as part of a line.

Figure 6:
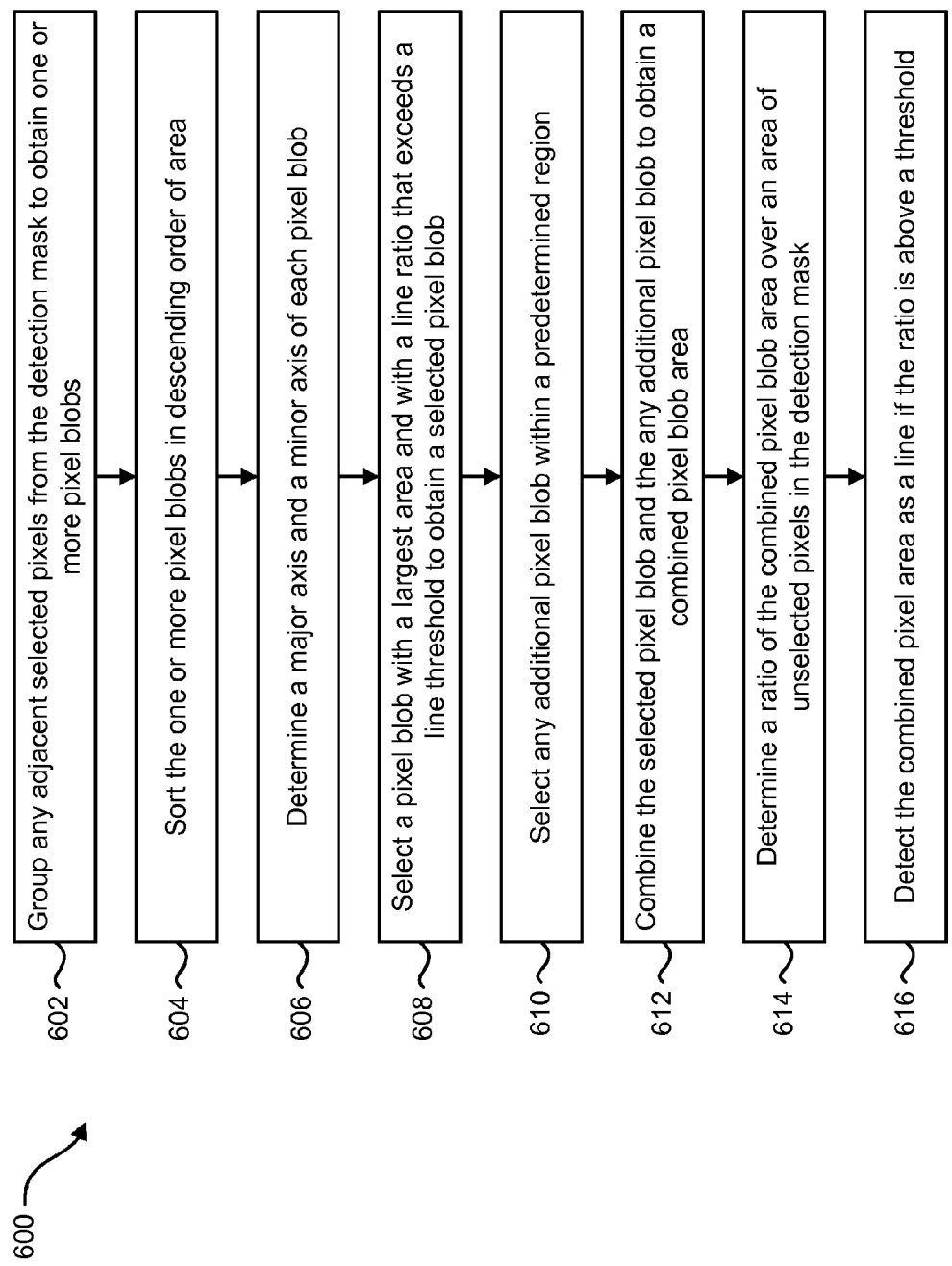
FIG. 6 is a flow diagram illustrating one configuration of a method for detecting a line on an electronic device.

FIG. 6 is a flow diagram illustrating one configuration of a method 600 for detecting a line on an electronic device 102. The electronic device 102 may group 602 any adjacent selected pixels from the detection mask 114 to obtain one or more pixel blobs (e.g., pixel blobs 522a-d as illustrated in FIG. 5). In one configuration, the detection mask 114 may be may be a binary mapping of selected pixels (e.g., corresponding to a defect detection) and unselected pixels (e.g., corresponding to no default detection). In this configuration, any grouping of selected pixels may be bounded by unselected pixels. Thus, any adjacent selected pixels may be grouped 602 together as a pixel blob (e.g., group of contiguous selected pixels).

The electronic device 102 may sort 604 the one or more pixel blobs in descending order of area. For example, the pixel blob with the largest area may be in a first position and the pixel blob with the smallest area may be in a last position. It may be noted that the electronic device 102 may alternatively sort 604 the one or more pixel blobs in ascending order of area, however, the largest pixel blob may be in a last position instead of a first position.

The electronic device 102 may determine 606 a major axis and a minor axis of each pixel blob. For example, major axis and minor axis may correspond to major axis 520a and minor axis 520b as illustrated in FIG. 5.

The electronic device 102 may select 608 a pixel blob with a largest area and with a line ratio that exceeds a line threshold to obtain a selected blob. For example, the line ratio may be a ratio of the major axis of the pixel blob over the minor axis of the pixel blob. The line threshold may be predetermined to filter out pixel blobs that are not potential lines. In one configuration, the line ratio is determined for the first entry (e.g., the pixel blob with the largest area) of the sorted list. If the line ratio exceeds the line threshold, then the first entry may be the selected pixel blob. However, if the line ratio is less than the line threshold, then the line ratio is determined for the next entry (e.g., the pixel blob with the next largest area) of the sorted list. When a line ratio exceeds the line threshold, then that pixel blob may be selected 608 as the selected pixel blob.

The electronic device 102 may select 610 any additional pixel blob within a predetermined region. For example, predetermined region may be along the major axis of the selected pixel blob. In one configuration, the predetermined region may be rectangular about the major axis of the selected pixel blob. For example, as illustrated in FIG. 5, pixel blobs 522b-d may each be along the major axis of the selected pixel blob (e.g., pixel blob A 522a). However, in one configuration as illustrated in FIG. 5, the predetermined region may include pixel blob C 522c and pixel blob D 522d (e.g., because the distances 524c-d are within the predetermined region) but not include pixel blob B 522b (e.g., because distance B 524b exceeds the bounds of the predetermined region). In this scenario, pixel blob C 522c and pixel blob D 522d may be selected 610 as any additional pixel blobs.

The electronic device 102 may combine 612 the selected pixel blob and any additional pixel blob to obtain a combined pixel blob area. For example, continuing with the example from above, the electronic device 102 may combine 612 pixel blob A 522a and pixel blob C 522c and pixel blob D 522d together to obtain a combined pixel blob area. In this case (e.g., with no overlapping pixel blog area), the combined pixel blob area may be the sum total of each of the pixel blob areas combined 612.

The electronic device 102 may determine 614 a ratio of the combined pixel blob area over an area of unselected pixels in the detection mask 114. For example, the unselected pixels in the detection mask 114 may correspond to the unselected pixels during thresholding. In one configuration, area may be defined in terms of number of pixels (e.g., the number of pixels in the combined pixel blob area, the number of pixels that are unselected in the detection mask 114).

The electronic device 102 may detect 616 the combined pixel area as a line if the ratio is above a threshold. For example, if the ratio is above a certain percentage (e.g., 70% threshold), then the combined pixel blob area may be designated (e.g., saved and treated) as a line. If the ratio is not above the threshold, then the combined pixel blob area is not designated (e.g., not treated) as a line.

Figure 7:
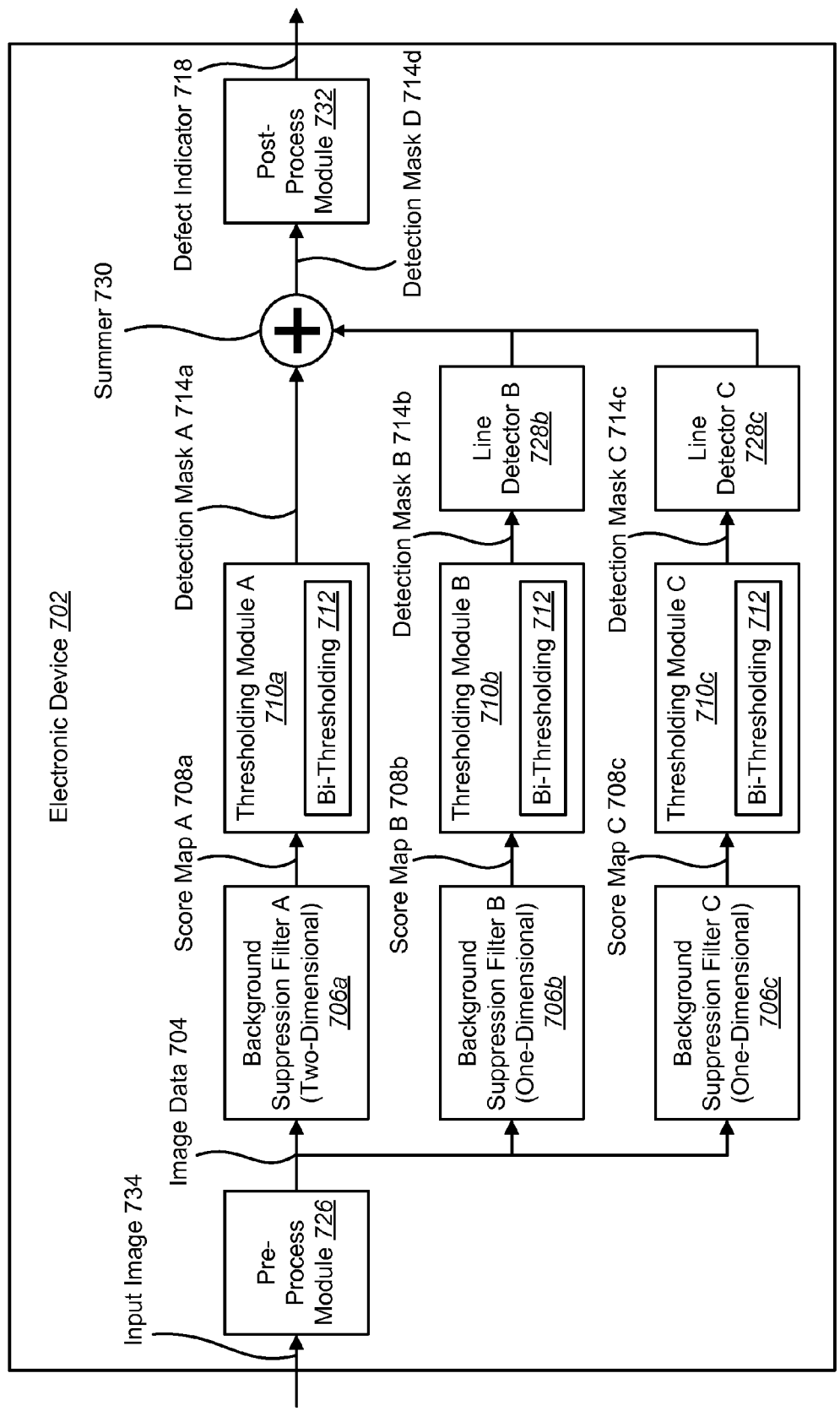
FIG. 7 is a block diagram illustrating another configuration of an electronic device in which systems and methods for defect detection may be implemented.

FIG. 7 is a block diagram illustrating another configuration of an electronic device 702 in which systems and methods for defect detection may be implemented. It should be noted that one or more of the elements illustrated as included within the electronic device 702 may be implemented in hardware, software or a combination of both. For example, the electronic device 702 may include one or more thresholding modules 710a-c, which may be implemented in hardware, software or a combination of both. For instance, the thresholding modules 710a-c may be implemented as a circuit, integrated circuit, application-specific integrated circuit (ASIC), processor in electronic communication with memory with executable instructions, firmware, field-programmable gate array (FPGA), etc., or a combination thereof.

The electronic device 702 may optionally include a pre-process module 726 for preprocessing the input image 734. For example, the pre-process module 726 may perform downsampling, de-noising and/or contrast enhancement on the input image 734. The pre-process module 726 may output image data 704 based on the input image 734. In a configuration where the pre-process module 726 is not included, the input image 734 may be the image data 704.

The electronic device 702 may include a plurality of background suppression filters 706a-c. For example, in one configuration (as illustrated), the electronic device 702 may include a two-dimensional background suppression filter (e.g., background suppression filter A 706a) and two one-dimensional background suppression filters (e.g., background suppression filter B 706b and background suppression filter C 706c). In another configuration (not shown), the electronic device 702 may include one or more one-dimensional background suppression filters. A one-dimensional background suppression filter may be based on a one-dimensional transform (e.g., DFT, WHT). In contrast, a two-dimensional transform may be based on a two-dimensional transform (e.g., DFT, WHT, SVD based, KLT, DChebT, DKrawT, etc.).

The background suppression filters 706a-c may receive image data 704 and may output one or more score maps 708a-c based on the image data 704. In some configurations, the background suppression filters 706a-c may be coupled to the pre-process module 726. The background suppression filters 706a-c may receive the image data 704 from the pre-process module 726. The image data 704 may be an array of values (e.g., pixel values) corresponding to the input image 734. The background suppression filters 706a-c may perform background suppression on the image data 704 to obtain the one or more score maps 708a-c. The background suppression filters 706a-c may be similar to the background suppression filter 106 described previously with respect to FIG. 1.

Background suppression filter A 706a may output score map A 708a based on a two-dimensional transform. Based on the properties of a two-dimensional transform, in some configurations, background suppression filter A 706a may suppress line-shaped defects. In other words, the two-dimensional transform may suppress line-shaped defects (e.g., horizontal and vertical) during the suppression process.

In contrast, a one-dimensional transform may suppress line-shaped defects in one direction (e.g., vertical or horizontal) but may capture the line-shaped defects in the other direction (e.g., horizontal or vertical). For example, background suppression filter B 706b may perform background suppression filtering on the rows (e.g., each row) of the image data 704. In this configuration, background suppression filter B 706b may suppress line-shaped defects in the horizontal direction but may capture line-shaped defects in the vertical direction. In other words, based on the properties of a one-dimensional transform, line-shaped defects in the horizontal direction may not be captured, but line-shaped defects in the vertical direction may be captured. Thus, if background suppression filter B 706b performs background suppression filtering on each row of the image data 704 then score map B 708b may reflect line-shaped defects in the vertical direction. In another configuration, background suppression filter B 706b might perform background suppression filtering on each column of the image data 704 (thus, allowing background suppression filter B 706b to detect line-shaped defects in the horizontal direction, but not in the vertical direction, for example).

Continuing from the example above, background suppression filter C 706c may perform background suppression filtering on the columns (e.g., each column) of the image data 704. In this configuration, background suppression filter C 706c may suppress line-shaped defects in the vertical direction but may capture line-shaped defects in the horizontal direction. In other words, based on the properties of a one-dimensional transform, line-shaped defects in the vertical direction may not be captured, but line-shaped defects in the horizontal direction may be captured. Thus, if background suppression filter C 706c performs background suppression filtering on each column of the image data 704 then score map C 708c may reflect line-shaped defects in the horizontal direction. In another configuration, background suppression filter C 706c might perform background suppression filtering on each row of the image data 704 (thus, allowing background suppression filter C 706*c* to detect line-shaped defects in the vertical direction, but not in the horizontal direction, for example).

As illustrated in FIG. 7, the electronic device 702 may utilize the combination of a one-dimensional background suppression filter (e.g., background suppression filter B 706*b*) for each row and a one-dimensional background suppression filter (e.g., background suppression filter C 706*c*) for each column to capture line-shaped defects in both the vertical and horizontal directions. This functionality may additionally be pared with background suppression filter A 706*a* that may capture other defects (e.g., non-line-shaped defects). Although, it is noted that the combination of a one-dimensional background suppression filter for each row of the image data 704 and a one-dimensional background suppression filter for each column of the image data 704 may capture any defects that the two-dimensional background suppression filter may capture as well as line-shaped defects in both the vertical and horizontal directions.

The electronic device 702 may include thresholding modules 710*a-c*. The thresholding modules 710*a-c* may perform thresholding (e.g., binarization) on the respective score maps 708*a-c* to produce respective detection masks 714*a-c*. Thresholding modules 710*a-c* may be similar to thresholding module 110 described previously with respect to FIG. 1. Thresholding modules 710*a-c* may each perform bi-thresholding 712.

The electronic device 702 may include line detectors 728*b-c*. In some configurations, line detector B 728*b* may be coupled to thresholding module B 710*b*. Line detector B 728*b* may receive detection mask B 714*b* from thresholding module B 710*b*. Similarly, line detector C 728*c* may be coupled to thresholding module C 710*c* in some configurations. Line detector C 728*c* may receive detection mask C 714*c* from thresholding module C 710*c*. Line detectors 728*b-c* may perform line detection based on the respective detection masks 714*b-c*. For example, line detectors 728*b-c* may perform line detection based on the method 600 described above in connection with FIG. 6. Continuing with the example above where background suppression filter B 706*b* is performing background suppression on each row of the image data 704 and background suppression filter C 706*c* is performing background suppression on each column of the image data 704, line detector B 728*b* may detect line-shaped defects and line detector C 728*c* may detect line-shaped defects. In one configuration, line detectors 728*b-c* may output a line detection if a line-shaped defect is detected.

The electronic device 702 may also include a summer 730. The summer 730 may sum the output of thresholding module A 710*a* (e.g., detection mask A 714*a*) and the outputs of line detector B 728*b* and line detector C 728*c* to output detection mask D 714*d*. However, detection mask A 714*a* may only be summed with the outputs of line detector B 728*b* and line detector C 728*c* that indicate a defect in some configurations. If neither line detector B 728*b* nor line detector C 728*c* detects a line-shaped defect, for instance, then detection mask D 714*d* may be the same as detection mask A 714*a*. However, in one configuration, if line detector B 728*b* and/or line detector C 728*c* detect a line-shaped defect, then detection mask A 714*a* may be a supplemented with the line-shaped defect detection(s) resulting in detection mask D 714*d*. In one configuration, the summer 730 (or sum operation) may perform a pixel-wise OR operation of detection masks. For example, the pixel-wise OR operation may consist of a pixel-wise OR operation of detection mask A 714*a*, the output of line detector B 728*b* on detection mask B 714*b* and the output of line detector C 728*c* on detection mask C 714*c*.

The electronic device 702 may include a post-process module 732 for post processing detection mask D 714*d*. For example, the post-process module 732 may perform blob analysis to improve detection mask D 714*d*. The post-process module 732 may output a defect indicator 718. Defect indicator 718 may be similar to defect indicator 118 described previously with respect to FIG. 1.

Figure 8:
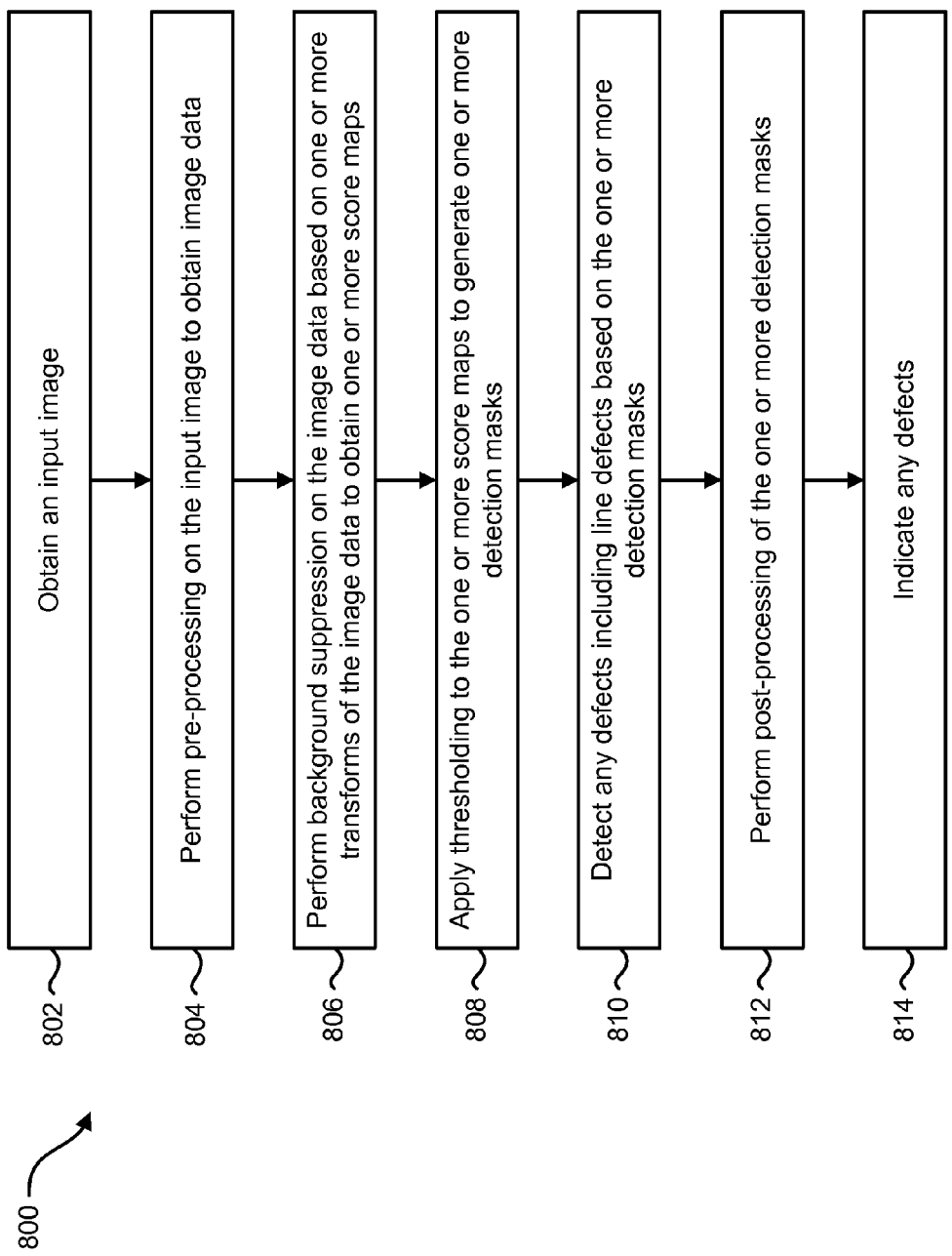
FIG. 8 is a flow diagram illustrating one configuration of a method for defect detection on an electronic device.

FIG. 8 is a flow diagram illustrating one configuration of a method 800 for defect detection on an electronic device 702. The electronic device 702 may obtain 802 an input image 734. Examples of an input image 734 include raw image data, compressed image data, an array of pixel values, a bitmap, etc. In one configuration, the input image 734 may be obtained 802 directly from an imaging device (e.g., camera, sensor array, etc.). In another configuration, the input image 734 may be obtained 802 from a program (e.g., software, firmware, etc.) or from a file.

The electronic device 702 may perform 804 pre-processing on the input image 734 to obtain image data 704. Examples of pre-processing include down-sampling, de-noising, contrast enhancement, etc. For example, the input image 734 may be down-sampled to obtain image data 704.

The electronic device 702 may perform 806 background suppression on the image data 704 based on one or more transforms of the image data 704 to obtain one or more score maps 708*a-c*. Performing 806 background suppression on the image data 704 may be similar to performing 204 background suppression on the image data 104 as described previously with respect to FIG. 2. In one configuration, background suppression may be performed 806 based on a single one-dimensional transform. In another configuration, background suppression may be performed 806 based on two or more one-dimensional transforms (e.g., one for capturing vertical line-shaped defects based on row data and another for capturing horizontal line-shaped defects based on column data). In yet another configuration, background suppression may be performed 806 based on a combination of one or more one-dimensional transforms and one or more two-dimensional transforms (one example of which is illustrated in FIG. 7, for instance).

The electronic device 702 may apply 808 thresholding to the one or more score maps 708*a-c* to generate one or more detection masks 714*a-c*. In one configuration, the thresholding comprises bi-thresholding 712. Applying 808 thresholding may be similar to applying thresholding 206 described previously with respect to FIG. 2.

The electronic device 702 may detect 810 any defects including line defects based on the one or more detection masks 714*a-c*. For example, the electronic device 702 may detect 810 a line defect based on a one-dimensional transform (e.g., background suppression filters 706*b-c*) and/or line detection (e.g., line detectors 728*b-c*). Detecting 810 any defects may be similar to detecting 208 any defects discussed previously with respect to FIG. 2.

The electronic device 702 may perform 812 post-processing of the one or more detection masks 714*a-c*. For example, the electronic device 702 may use blob analysis to improve the detection mask(s) 714*a-d*. In one configuration, line detection (e.g., blob analysis on line-shaped defects) may be included in post-processing.

The electronic device 702 may indicate 814 any defects. For example, the electronic device 702 may indicate 814 one or more pixel blob defects and/or one or more line-shaped defects. Indicating 814 any defects may be similar to indicating 210 any defects discussed previously with respect to FIG. 2.

Figure 9:
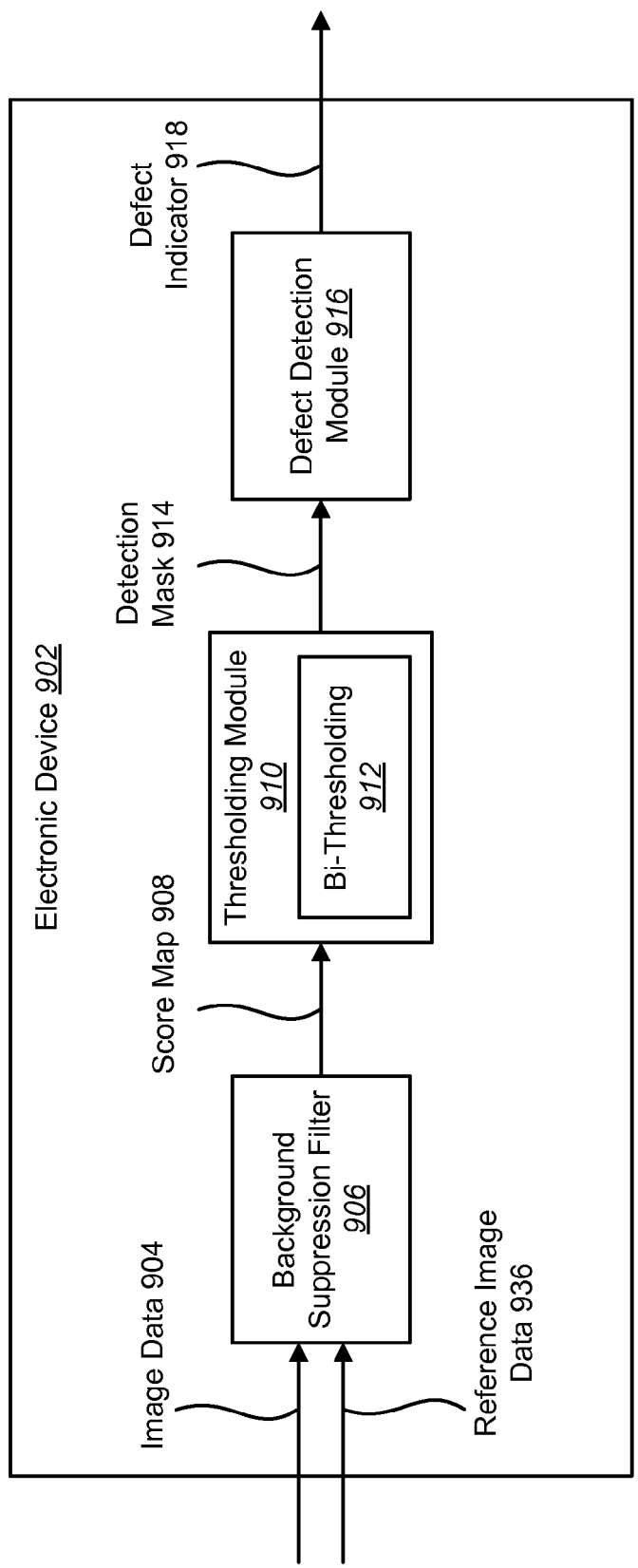
FIG. 9 is a block diagram illustrating another configuration of an electronic device in which systems and methods for defect detection may be implemented.

FIG. 9 is a block diagram illustrating another configuration of an electronic device 902 in which systems and methods for defect detection may be implemented. It should be noted that one or more of the elements illustrated as included within the electronic device 902 may be implemented in hardware, software or a combination of both. For example, the electronic device 902 may include a thesholding module 910, which may be implemented in hardware, software or a combination of both. For instance, the thresholding module 910 may be implemented as a circuit, integrated circuit, application-specific integrated circuit (ASIC), processor in electronic communication with memory with executable instructions, firmware, field-programmable gate array (FPGA), etc., or a combination thereof.

The electronic device 902 may include a background suppression filter 906. The background suppression filter 906 may receive image data 904 and reference image data 936 and may output a score map 908 based on the image data 904 and the reference image data 936. Image data 904 may comprise pixel values corresponding to an input image that may depict possible defects. Reference image data 936 may comprise pixel values corresponding to a reference image (as described above, for instance) that is known to depict a defect free image. The background suppression filter 906 may perform background suppression on the image data 904 with respect to the reference image data 936 to obtain the score map 908. The background suppression filter 906 may filter (e.g., perform background suppression) based on a transform (e.g., a discrete transform) of the image data 904 and based on the transform of the reference image data 936. For example, in one configuration, the background suppression filter 906 may extract event information (e.g., phase information, sign information) from the image data 904 by performing a transform on the image data 904, performing a transform on the reference image data 936, performing an operation on the resulting coefficients (e.g., dividing each transform coefficient from the image data 904 by the magnitude of the corresponding transform coefficient from the reference image data 936) and performing an inverse transform on the results of the operation. The score map 908 may be based on the inverted transform of the results of the operation. Thus, in this configuration, the score map 908 may represent event information from the image data 904 is with respect to the reference image data 936.

In one configuration, the thresholding module 910 may be coupled to the background suppression filter 906. The thresholding module 910 may receive the score map 908 from the background suppression filter 906. The thresholding module may perform thresholding on the score map 908 to obtain a detection mask 914. Examples of thresholding include fixed thresholding (e.g., threshold is a fixed value, fixed value of 4 as used in PHOT for defect detection for paper, for example), percentage thresholding (e.g., threshold selected for keeping a certain percentage of pixels), Otsu thresholding (e.g., threshold determined from histogram threshold that maximizes cross variance between the histogram above and below the threshold) and maximal mutual information thresholding. More particularly, the thresholding module 910 may perform bi-thresholding 912. In one example, the thresholding module 910 may binarize (e.g., using bi-thresholding 912) the score map 908 into a detection mask 914.

The electronic device 902 may also include a defect detection module 916. In one configuration, the defect detection module 916 may be coupled to the thresholding module 910. The defect detection module 916 may receive the detection mask 914 from the thresholding module 910. The defect detection module 916 may output a defect indicator 918 based on the detection mask 914. In one configuration, the defect indicator 918 may indicate the pixel locations corresponding to a defect detection. In this configuration, the defect indicator 918 may indicate any defects based on the defect free reference image data 936.

Figure 10:
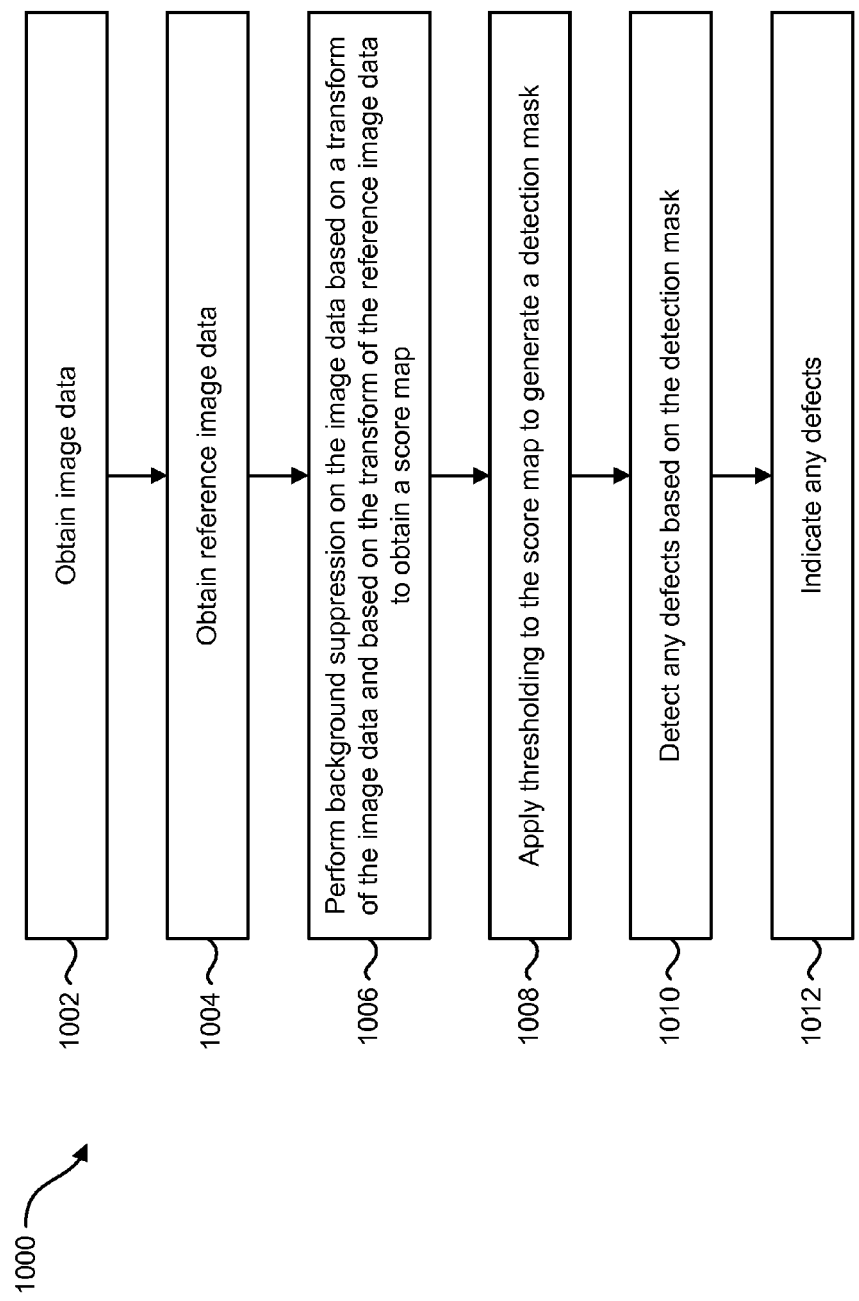
FIG. 10 is a flow diagram illustrating another configuration of a method for defect detection on an electronic device.

FIG. 10 is a flow diagram illustrating another configuration of a method 1000 for defect detection on an electronic device 902. The electronic device 902 may obtain 1002 image data 904. Obtaining 1002 image data 904 may be similar to obtaining one or more of obtaining 802, 202 image data described previously with respect to FIGS. 8 and 2 respectively. The electronic device 902 may obtain 1004 reference image data 936. Obtaining 1004 may be similar to obtaining 1002 described previously.

The electronic device 902 may perform 1006 background suppression on the image data 904 based on a transform of the image data 904 and based on the transform of the reference image data 936 to obtain a score map 908. For example, the electronic device 902 may perform 1006 background suppression by transforming the image data 904 and the reference image data 936 with a WHT transform. The electronic device 902 may divide each transform coefficient from the image data 904 by the corresponding transform coefficient from the reference image data 936. Thus, the phase information is extracted with respect to the known, defect free, reference image data 936. The electronic device 902 may perform an inverse WHT transform on the extracted phase information to obtain the score map 908. Performing 1006 background suppression may be similar to one or more of performing 806, 204 background suppression described previously with respect to FIGS. 8 and 2, respectively.

The electronic device 902 may apply 1008 thresholding to the score map 908 to generate a detection mask 914. In one configuration, applying 1008 thresholding comprises applying 1008 bi-thresholding 912. Applying 1008 thresholding may be similar to applying 808, 206 thresholding described previously with respect to one or more of FIGS. 8 and 2, respectively.

The electronic device 902 may detect 1010 any defects based on the detection mask 914. Detecting 1010 any defects may be similar to detecting 810, 208 any defects described previously with respect to one or more of FIGS. 8 and 2 respectively. The electronic device 902 may indicate 1012 any defects. Indicating 1012 may be similar to indicating 814, 210 any defects described previously with respect to one or more of FIGS. 8 and 2, respectively.

Figure 11:
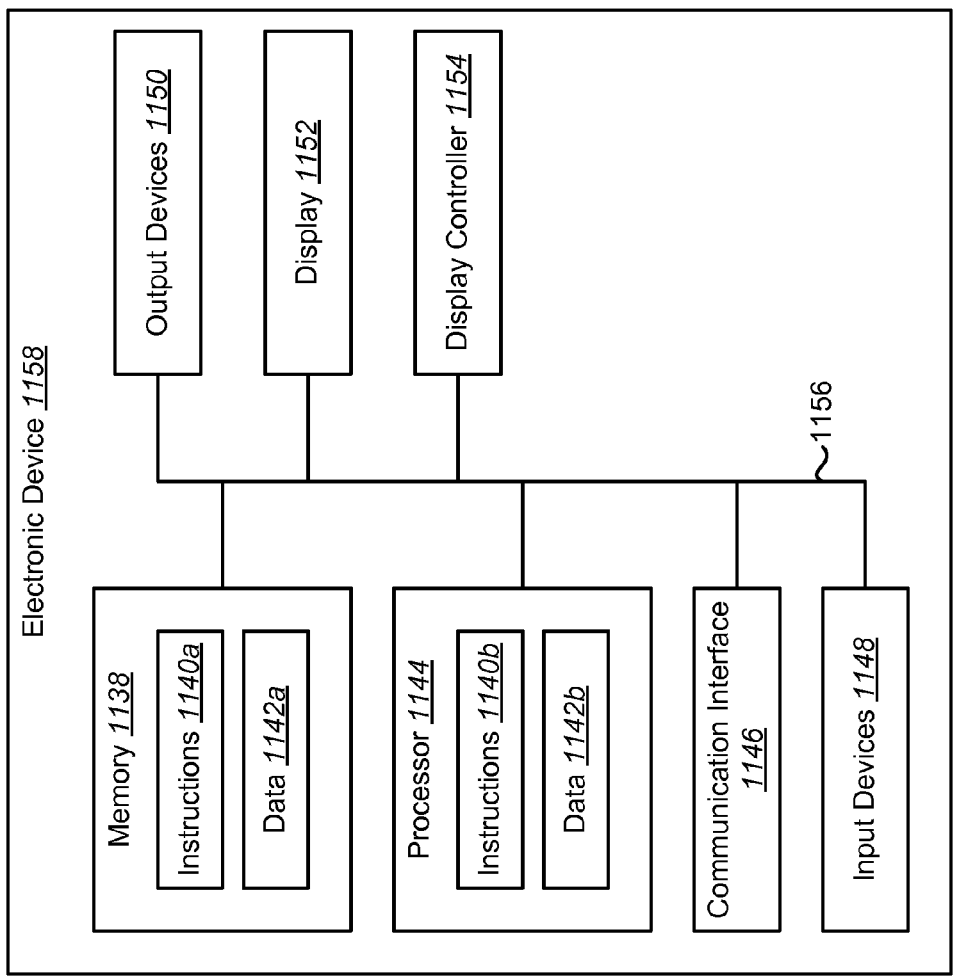
FIG. 11 illustrates various components that may be utilized in an electronic device.

FIG. 11 illustrates various components that may be utilized in an electronic device 1158. The electronic device 1158 may be implemented as one or more of the electronic devices 102, 702, 902 described previously. For example, the electronic device 1158 may be implemented as the electronic device 102 described above in connection with FIG. 1, as the electronic device 702 described above in connection with FIG. 7 or both.

The electronic device 1158 includes a processor 1144 that controls operation of the electronic device 1158. The processor 1144 may also be referred to as a CPU. Memory 1138, which may include both read-only memory (ROM), random access memory (RAM) or any type of device that may store information, provides instructions 1140a (e.g., executable instructions) and data 1142a to the processor 1144. A portion of the memory 1138 may also include non-volatile random access memory (NVRAM). The memory 1138 may be in electronic communication with the processor 1144.

Instructions 1140b and data 1142b may also reside in the processor 1144. Instructions 1140b and/or data 1142b loaded into the processor 1144 may also include instructions 1140a and/or data 1142a from memory 1138 that were loaded for execution or processing by the processor 1144. The instructions 1140*b* may be executed by the processor 1144 to implement one or more of the systems and methods (e.g., one or more of the methods 200, 300, 400, 600, 800, 1000) disclosed herein.

The electronic device 1158 may include one or more communication interfaces 1146 for communicating with other electronic devices. The communication interfaces 1146 may be based on wired communication technology, wireless communication technology, or both. Examples of communication interfaces 1146 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a wireless transceiver in accordance with $3^{rd}$ Generation Partnership Project (3GPP) specifications and so forth.

The electronic device 1158 may include one or more output devices 1150 and one or more input devices 1148. Examples of output devices 1150 include a speaker, printer, etc. One type of output device that may be included in an electronic device 1158 is a display device 1152. Display devices 1152 used with configurations disclosed herein may utilize any suitable image projection technology, such as a cathode ray tube (CRT), liquid crystal display (LCD), light-emitting diode (LED), gas plasma, electroluminescence or the like. A display controller 1154 may be provided for converting data stored in the memory 1138 into text, graphics, and/or moving images (as appropriate) shown on the display 1152. Examples of input devices 1148 include a keyboard, mouse, microphone, remote control device, button, joystick, trackball, touchpad, touchscreen, lightpen, etc.

The various components of the electronic device 1158 are coupled together by a bus system 1156, which may include a power bus, a control signal bus and a status signal bus, in addition to a data bus. However, for the sake of clarity, the various buses are illustrated in FIG. 11 as the bus system 1156. The electronic device 1158 illustrated in FIG. 11 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods or approaches described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An electronic device configured for defect detection, comprising:
   a processor;
   memory in electronic communication with the processor;
   instructions stored in the memory, the instructions being executable to:
   obtain image data;
   perform background suppression on the image data based on a transform of the image data to obtain a score map;
   apply thresholding to the score map to generate a detection mask, wherein the thresholding comprises bi-thresholding;
   detect any defects based on the detection mask; and
   indicate any defects.

2. The electronic device of claim 1, wherein applying bi-thresholding comprises:
   selecting any pixel with a score that exceeds a first threshold, wherein any pixel with a score that exceeds the first threshold is a seed;
   selecting any pixel with a score that exceeds a second threshold and that is located within a predetermined proximity to the seed, wherein the selection is based on a forward scan; and
   selecting any pixel with a score that exceeds the second threshold and that is located within the predetermined proximity to the seed, wherein the selection is based on a backward scan.

3. The electronic device of claim 1, wherein applying bi-thresholding comprises locally adaptive thresholding.

4. The electronic device of claim 1, wherein the transform comprises a two-dimensional discrete transform.

5. The electronic device of claim 4, wherein the transform is one of the group consisting of a Discrete Fourier Transform, Walsh-Hadamard Transform, a transform based on singular value decomposition and a transform based on discrete polynomials.

6. The electronic device of claim 1, wherein the transform comprises a one-dimensional discrete transform.

7. The electronic device of claim 6, wherein the transform is one of the group consisting of a Discrete Fourier Transform and a Walsh-Hadamard Transform.

8. The electronic device of claim 6, wherein the one-dimensional discrete transform is performed on each row of the image data.

9. The electronic device of claim 6, wherein the one-dimensional discrete transform is performed on each column of the image data.

10. The electronic device of claim 1, wherein the transform comprises at least one one-dimensional transform in combination with a two-dimensional transform.

11. The electronic device of claim 1, wherein detecting any defects comprises determining if the detection mask includes a line.

12. The electronic device of claim 11, wherein determining if the detection mask includes a line comprises:
grouping any adjacent selected pixels from the detection mask to obtain one or more pixel blobs;
sorting the one or more pixel blobs in descending order of area;
determining a major axis and a minor axis of each pixel blob;
selecting a pixel blob with a largest area and with a line ratio that exceeds a line threshold to obtain a selected pixel blob;
selecting any additional pixel blob within a region;
combining the selected pixel blob and any additional pixel blob to obtain a combined pixel blob area;
determining a ratio of the combined pixel blob area over an area of unselected pixels in the detection mask; and
detecting the combined pixel blob area as a line if the ratio is above a threshold.

13. The electronic device of claim 1, wherein performing background suppression on the image data comprises:
obtaining reference image data;
performing a forward transform on the image data to obtain an image data coefficient;
performing the forward transform on the reference image data to obtain a reference image data coefficient;
extracting information from the image data coefficient based on the reference image data coefficient to obtain extracted information;
performing an inverse transform on the extracted information to obtain a feature map; and
generating the score map based on the feature map.

14. The electronic device of claim 13, wherein the extracted information comprises one of sign information and phase information.

15. The electronic device of claim 13, wherein the forward transform is the transform based on singular value decomposition.

16. The electronic device of claim 13, wherein the forward transform is a Walsh-Hadamard Transform.

17. A method for defect detection on an electronic device, comprising:
obtaining image data;
performing, by the electronic device, background suppression on the image data based on a transform of the image data to obtain a score map;
applying, by the electronic device, thresholding to the score map to generate a detection mask, wherein the thresholding comprises bi-thresholding;
detecting any defects based on the detection mask; and
indicating any defects.

18. The method of claim 17, wherein the bi-thresholding comprises:
selecting any pixel with a score that exceeds a first threshold, wherein any pixel with a score that exceeds the first threshold is a seed;
selecting any pixel with a score that exceeds a second threshold and that is located within a predetermined proximity to the seed, wherein the selection is based on a forward scan; and
selecting any pixel with a score that exceeds the second threshold and that is located within the predetermined proximity to the seed, wherein the selection is based on a backward scan.

19. The method of claim 17, wherein the bi-thresholding comprises locally adaptive thresholding.

20. The method of claim 17, wherein the transform comprises a two-dimensional discrete transform.

21. The method of claim 20, wherein the transform is one of the group consisting of a Discrete Fourier Transform, Walsh-Hadamard Transform, a transform based on singular value decomposition and a transform based on discrete polynomials.

22. The method of claim 17, wherein the transform comprises a one-dimensional discrete transform.

23. The method of claim 22, wherein the transform is one of the group consisting of a Discrete Fourier Transform and Walsh-Hadamard Transform.

24. The method of claim 22, wherein the one-dimensional discrete transform is performed on each row of the image data.

25. The method of claim 22, wherein the one-dimensional discrete transform is performed on each column of the image data.

26. The method of claim 17, wherein the transform comprises at least one one-dimensional transform in combination with a two-dimensional transform.

27. The method of claim 17, wherein detecting any defects comprises determining if the detection mask includes a line.

28. The method of claim 27, wherein determining if the detection mask includes a line comprises:
grouping any adjacent selected pixels from the detection mask to obtain one or more pixel blobs;
sorting the one or more pixel blobs in descending order of area;
determining a major axis and a minor axis of each pixel blob;
selecting a pixel blob with a largest area and with a line ratio that exceeds a line threshold to obtain a selected pixel blob;
selecting any additional pixel blob within a region;
combining the selected pixel blob and any additional pixel blob to obtain a combined pixel blob area;
determining a ratio of the combined pixel blob area over an area of unselected pixels in the detection mask; and
detecting the combined pixel blob area as a line if the ratio is above a threshold.

29. The method of claim 17, wherein performing background suppression on the image data comprises:
obtaining reference image data;
performing a forward transform on the image data to obtain an image data coefficient;
performing the forward transform on the reference image data to obtain a reference image data coefficient;
extracting information from the image data coefficient based on the reference image data coefficient to obtain extracted information;
performing an inverse transform on the extracted information to obtain a feature map; and
generating the score map based on the feature map.

30. The method of claim 29, wherein the extracted information comprises one of sign information and phase information.

31. The method of claim 29, wherein the forward transform is the transform based on singular value decomposition.

32. The method of claim 29, wherein the forward transform is a Walsh-Hadamard Transform.

33. An electronic device configured for defect detection, comprising:
a processor;
memory in electronic communication with the processor;
instructions stored in the memory, the instructions being executable to:

obtain image data;

perform background suppression on the image data based on a Walsh-Hadamard Transform of the image data to obtain a score map;

apply thresholding to the score map to generate a detection mask;

detect any defects based on the detection mask; and indicate any defects.

34. A method for defect detection on an electronic device, comprising:

obtaining image data;

performing, by the electronic device, background suppression on the image data based on a Walsh-Hadamard Transform of the image data to obtain a score map;

applying, by the electronic device, thresholding to the score map to generate a detection mask;

detecting any defects based on the detection mask; and indicating any defects.

* * * * *